(12) United States Patent
Paduroiu

(10) Patent No.: US 11,755,555 B2
(45) Date of Patent: Sep. 12, 2023

(54) STORING AN ORDERED ASSOCIATIVE ARRAY OF PAIRS USING AN APPEND-ONLY STORAGE MEDIUM

(71) Applicant: EMC IP Holding Company LLC, Hopkinton, MA (US)

(72) Inventor: Andrei Paduroiu, Bellevue, WA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 169 days.

(21) Appl. No.: 17/063,906

(22) Filed: Oct. 6, 2020

(65) Prior Publication Data

US 2022/0107931 A1    Apr. 7, 2022

(51) Int. Cl.
G06F 16/22    (2019.01)
G06F 16/23    (2019.01)

(52) U.S. Cl.
CPC ...... *G06F 16/2272* (2019.01); *G06F 16/2282* (2019.01); *G06F 16/2365* (2019.01)

(58) Field of Classification Search
None
See application file for complete search history.

(56) References Cited

U.S. PATENT DOCUMENTS

| | | | |
|---|---|---|---|
| 3,617,587 A | 11/1971 | Nayar et al. | |
| 3,825,848 A | 7/1974 | Sternbeck et al. | |
| 5,826,977 A | 10/1998 | Fowler et al. | |
| 7,340,690 B2 | 3/2008 | Lau | |
| 7,430,570 B1 | 9/2008 | Srinivasan et al. | |
| 7,610,437 B2 | 10/2009 | Sinclair et al. | |
| 7,769,717 B2 | 8/2010 | Federwisch et al. | |
| 7,984,084 B2 | 7/2011 | Sinclair | |
| 8,285,918 B2 | 10/2012 | Maheshwari | |

(Continued)

FOREIGN PATENT DOCUMENTS

| CA | 2 534 170 A1 | 7/2007 |
|---|---|---|
| CA | 2672879 | 4/2008 |

(Continued)

OTHER PUBLICATIONS

Office Action dated Apr. 20, 2022 for U.S. Appl. No. 16/944,094, 48 pages.

(Continued)

*Primary Examiner* — Wilson Lee
(74) *Attorney, Agent, or Firm* — Amin, Turocy & Watson, LLP

(57) ABSTRACT

The described technology is generally directed towards efficiently organizing data in a single, non-distributed database as an ordered associated array of key-value pairs implemented on top of a storage medium that allows only data appends. A table segment in an append-only storage medium is accessed by table keys. The table keys are hashed into key values used to access information in an attribute index (a search tree) that contains offsets to the table segment entries. Hashing the table keys can result in a series of hash parts, including a primary hash part corresponding to a node in the attribute index, and as needed in the event of hash collisions, secondary hash parts that map to child nodes in the attribute index. The table keys are additionally organized in a sorted data structure which is stored within the table segment along with other keys.

20 Claims, 21 Drawing Sheets

(56) References Cited

U.S. PATENT DOCUMENTS

| | | |
|---|---|---|
| 8,443,263 B2 | 5/2013 | Selinger et al. |
| 8,572,091 B1 | 10/2013 | Sivasubramanian et al. |
| 8,655,825 B2 | 2/2014 | Roesch et al. |
| 8,732,403 B1 | 5/2014 | Nayak |
| 8,873,284 B2 | 10/2014 | Sinclair et al. |
| 8,984,248 B2 | 3/2015 | Morishita et al. |
| 9,223,693 B2 | 12/2015 | Sinclair et al. |
| 9,336,133 B2 | 5/2016 | Sinclair et al. |
| 9,348,746 B2 | 5/2016 | Sinclair et al. |
| 9,407,521 B1* | 8/2016 | Kulkarni ............... H04L 43/08 |
| 9,465,731 B2 | 10/2016 | Sinclair et al. |
| 9,514,018 B2 | 12/2016 | Sikri |
| 9,591,316 B2 | 3/2017 | Bracha et al. |
| 9,639,589 B1 | 5/2017 | Theimer et al. |
| 9,715,434 B1 | 7/2017 | Xu et al. |
| 9,734,050 B2 | 8/2017 | Sinclair et al. |
| 9,734,911 B2 | 8/2017 | Sinclair et al. |
| 9,753,932 B1 | 9/2017 | Brow et al. |
| 9,778,855 B2 | 10/2017 | Sinclair |
| 9,892,803 B2 | 2/2018 | Reed |
| 9,898,482 B1 | 2/2018 | Bono |
| 9,965,215 B1 | 5/2018 | Vazhenin et al. |
| 10,108,543 B1 | 10/2018 | Duggal et al. |
| 10,108,544 B1 | 10/2018 | Duggal et al. |
| 10,120,613 B2 | 11/2018 | Sinclair et al. |
| 10,133,490 B2 | 11/2018 | Sinclair et al. |
| 10,255,179 B2 | 4/2019 | Ji et al. |
| 10,338,834 B1 | 7/2019 | Dighe et al. |
| 10,430,279 B1 | 10/2019 | Dittia et al. |
| 10,565,208 B2 | 2/2020 | Triou, Jr. et al. |
| 10,628,424 B2 | 4/2020 | Park et al. |
| 10,705,741 B1 | 7/2020 | Varadarajan et al. |
| 10,795,812 B1 | 10/2020 | Duggal et al. |
| 10,860,457 B1 | 12/2020 | Evenson et al. |
| 10,867,033 B2 | 12/2020 | Keren et al. |
| 10,891,228 B2 | 1/2021 | Burow |
| 10,983,715 B2 | 4/2021 | Sharoni et al. |
| 11,016,826 B2 | 5/2021 | Lehmann |
| 11,086,537 B2 | 8/2021 | Byun |
| 11,194,638 B1 | 12/2021 | Danilov et al. |
| 11,314,779 B1 | 4/2022 | Jain |
| 11,354,054 B2 | 6/2022 | Danilov et al. |
| 2004/0199524 A1 | 10/2004 | Rys et al. |
| 2005/0025152 A1 | 2/2005 | Georgiou et al. |
| 2005/0055519 A1 | 3/2005 | Stuart et al. |
| 2006/0036568 A1 | 2/2006 | Moore et al. |
| 2006/0058987 A1 | 3/2006 | Kumar et al. |
| 2007/0033325 A1 | 2/2007 | Sinclair et al. |
| 2007/0047635 A1* | 3/2007 | Stojanovic ........ H04L 25/03006 375/229 |
| 2007/0220518 A1 | 9/2007 | Verbowski et al. |
| 2008/0059724 A1 | 3/2008 | Stifter, Jr. |
| 2008/0082596 A1 | 4/2008 | Gorobets |
| 2008/0144079 A1 | 6/2008 | Pandey et al. |
| 2008/0184262 A1 | 7/2008 | Ginis et al. |
| 2008/0189477 A1 | 8/2008 | Asano et al. |
| 2008/0288713 A1 | 11/2008 | Lee et al. |
| 2008/0301135 A1 | 12/2008 | Alves et al. |
| 2009/0182784 A1 | 7/2009 | Rohit et al. |
| 2010/0083098 A1 | 4/2010 | Leme et al. |
| 2010/0088296 A1 | 4/2010 | Periyagaram et al. |
| 2010/0077013 A1 | 5/2010 | Clements et al. |
| 2010/0125553 A1 | 5/2010 | Huang et al. |
| 2010/0125794 A1 | 5/2010 | Hampton et al. |
| 2010/0174881 A1 | 7/2010 | Anglin et al. |
| 2010/0205163 A1 | 8/2010 | Eshghi et al. |
| 2010/0281081 A1 | 11/2010 | Stager et al. |
| 2010/0333116 A1 | 12/2010 | Prahlad et al. |
| 2011/0126099 A1 | 5/2011 | Anderson et al. |
| 2011/0131588 A1 | 6/2011 | Allam et al. |
| 2011/0145473 A1 | 6/2011 | Maheshwari |
| 2011/0161784 A1 | 6/2011 | Selinger et al. |
| 2011/0249147 A1 | 10/2011 | Ishii |
| 2012/0102503 A1 | 4/2012 | Meijer et al. |
| 2012/0109985 A1 | 5/2012 | Chandrasekaran |
| 2012/0151014 A1 | 6/2012 | Gokhale et al. |
| 2012/0198027 A1 | 8/2012 | Hetzler et al. |
| 2012/0259994 A1 | 10/2012 | Gillies et al. |
| 2013/0226931 A1 | 8/2013 | Hazel et al. |
| 2013/0275808 A1 | 10/2013 | McNeeney et al. |
| 2014/0006465 A1 | 1/2014 | Davis et al. |
| 2014/0089264 A1 | 3/2014 | Talagala et al. |
| 2014/0223115 A1 | 8/2014 | Dinkjian et al. |
| 2014/0325148 A1 | 10/2014 | Choi et al. |
| 2014/0365719 A1 | 12/2014 | Kuzmin et al. |
| 2015/0169449 A1 | 6/2015 | Barrell et al. |
| 2015/0172120 A1 | 6/2015 | Dwarampudi et al. |
| 2015/0205816 A1 | 7/2015 | Periyagaram et al. |
| 2015/0227602 A1 | 8/2015 | Ramu et al. |
| 2015/0261776 A1 | 9/2015 | Attarde et al. |
| 2015/0341212 A1 | 11/2015 | Hsiao et al. |
| 2015/0355862 A1 | 12/2015 | Hayes et al. |
| 2015/0363245 A1 | 12/2015 | Mutschler |
| 2016/0042008 A1 | 2/2016 | Tripathy et al. |
| 2016/0063080 A1 | 3/2016 | Nano et al. |
| 2016/0210061 A1 | 7/2016 | Soncodi et al. |
| 2016/0246713 A1 | 8/2016 | Choi et al. |
| 2016/0321287 A1 | 11/2016 | Luthra et al. |
| 2016/0337435 A1 | 11/2016 | Nigam et al. |
| 2016/0350324 A1 | 12/2016 | Wang et al. |
| 2016/0357476 A1 | 12/2016 | Chen et al. |
| 2017/0038978 A1 | 2/2017 | Li et al. |
| 2017/0075832 A1 | 3/2017 | Bhimani et al. |
| 2017/0075947 A1 | 3/2017 | Kurilov et al. |
| 2017/0123655 A1 | 5/2017 | Sinclair et al. |
| 2017/0177249 A1 | 6/2017 | Kurilov et al. |
| 2017/0177263 A1 | 6/2017 | Das et al. |
| 2017/0177546 A1 | 6/2017 | Heinz et al. |
| 2017/0212891 A1 | 7/2017 | Pundir et al. |
| 2017/0213127 A1* | 7/2017 | Duncan ................ G16B 50/30 |
| 2017/0255392 A1 | 9/2017 | Nakashima |
| 2017/0289214 A1 | 10/2017 | Cho et al. |
| 2018/0101842 A1 | 4/2018 | Ventura et al. |
| 2018/0121307 A1 | 5/2018 | Braun et al. |
| 2018/0146018 A1 | 5/2018 | Chang et al. |
| 2018/0176244 A1 | 6/2018 | Gervais et al. |
| 2018/0184138 A1 | 6/2018 | Shaw et al. |
| 2018/0189175 A1 | 6/2018 | Ji et al. |
| 2018/0314727 A1 | 11/2018 | Epstein et al. |
| 2018/0329644 A1 | 11/2018 | Das et al. |
| 2018/0332325 A1 | 11/2018 | Kaitchuck |
| 2018/0332365 A1 | 11/2018 | Kaitchuck et al. |
| 2018/0332366 A1 | 11/2018 | Paduroiu |
| 2018/0332367 A1 | 11/2018 | Kaitchuck et al. |
| 2018/0336256 A1 | 11/2018 | Li et al. |
| 2018/0345140 A1 | 12/2018 | Posin |
| 2019/0004863 A1 | 1/2019 | Mainali et al. |
| 2019/0026301 A1 | 1/2019 | Wang et al. |
| 2019/0057138 A1 | 2/2019 | Knowles et al. |
| 2019/0129806 A1 | 5/2019 | Hsu et al. |
| 2019/0138494 A1 | 5/2019 | Inoue |
| 2019/0197173 A1 | 6/2019 | Tahara et al. |
| 2019/0278849 A1* | 9/2019 | Chandramouli .. G06F 16/24565 |
| 2019/0327297 A1 | 10/2019 | Madani |
| 2019/0332318 A1 | 10/2019 | Gooding et al. |
| 2019/0340180 A1 | 11/2019 | Barsness et al. |
| 2019/0349422 A1 | 11/2019 | Dhruvakumar et al. |
| 2020/0034468 A1 | 1/2020 | Lei et al. |
| 2020/0089420 A1 | 3/2020 | Sharoni et al. |
| 2020/0174695 A1 | 6/2020 | Bazarsky et al. |
| 2020/0242103 A1 | 7/2020 | Paduroiu |
| 2020/0250172 A1 | 8/2020 | Busjaeger et al. |
| 2020/0310686 A1 | 10/2020 | Truong et al. |
| 2020/0320005 A1 | 10/2020 | Shulman et al. |
| 2020/0344299 A1 | 10/2020 | Sohail et al. |
| 2020/0394196 A1 | 12/2020 | Shivanna et al. |
| 2020/0404011 A1 | 12/2020 | Gervais et al. |
| 2021/0110328 A1 | 4/2021 | Hsiao et al. |
| 2021/0124746 A1 | 4/2021 | Klaedtke |
| 2021/0157520 A1 | 5/2021 | Bavishi et al. |
| 2021/0256029 A1 | 8/2021 | Danilov et al. |
| 2021/0342296 A1 | 11/2021 | Danilov et al. |
| 2021/0342354 A1 | 11/2021 | Danilov et al. |
| 2021/0365211 A1 | 11/2021 | Danilov et al. |

(56) References Cited

U.S. PATENT DOCUMENTS

| | | | |
|---|---|---|---|
| 2021/0374021 | A1 | 12/2021 | Santhakumar et al. |
| 2022/0035533 | A1 | 2/2022 | Danilov et al. |
| 2022/0182724 | A1 | 6/2022 | Gupta et al. |

FOREIGN PATENT DOCUMENTS

| | | | |
|---|---|---|---|
| CN | 1708029 | | 12/2005 |
| CN | 104901958 | | 9/2015 |
| CN | 105591926 | | 5/2016 |
| GB | 2377038 | | 12/2002 |
| WO | 2002101585 | | 12/2002 |
| WO | 2004/080067 | A1 | 9/2004 |
| WO | 2009014993 | | 1/2009 |
| WO | 2015/196281 | A1 | 12/2015 |
| WO | 2015191120 | | 12/2015 |
| WO | 2018148149 | | 8/2018 |

OTHER PUBLICATIONS

M. Liu, M. Li, D. Golovnya, E. A. Rundensteiner and K. Claypool, "Sequence Pattern Query Processing over Out-of-Order Event Streams," 2009 IEEE 25th International Conference on Data Engineering, 2009, pp. 784-795, doi 10.1109/ICDE.2009.95. (Year: 2009).

Notice of Allowance dated Apr. 27, 2022 for U.S. Appl. No. 17/127,724, 19 pages.

Office Action dated May 24, 2022 for U.S. Appl. No. 17/237,535, 62 pages.

Aloysius K. Mok, Honguk Woo and Chan-Gun Lee, "Probabilistic Timing Join over Uncertain Event Streams," 12th IEEE International Conference on Embedded and Real-Time Computing Systems and Applications (RTCSA'06), 2006, pp. 17-26, doi: 10.1109/RTCSA.2006.52. (Year: 2006).

T. Onishi, J. Michaelis and Y. Kanemasa, "Recovery-Conscious Adaptive Watermark Generation for Time-Order Event Stream Processing," 2020 IEEE/ACM Fifth International Conference on Internet-of-Things Design and Implementation (IoTDI), 2020, pp. 66-78, doi: 10.1109/IoTDI49375.2020.00014. (Year: 2020).

Office Action dated Mar. 21, 2022 for U.S. Appl. No. 16/864,905, 125 pgs.

Edi Muskardin et al., "Implementation of Hashing Algorithms in Stream Mining", International Conference on Smart Systems and Technologies (SST), Oct. 2018, pp. 233-238.

Notice of Allowance dated Apr. 11, 2022 for U.S. Appl. No. 16/944,089, 87 pages.

J. C. Lee, J. Vance and R. Lysecky, "Hardware-Based Event Stream Ordering for System-Level Observation Framework," in IEEE Embedded Systems Letters, vol. 6, No. 4, pp. 81-84, Dec. 2014, doi: 10.1109/LES.2014.2359154. (Year: 2014).

Office Action dated Apr. 12, 2022 for U.S. Appl. No. 17/038,102, 48 pages.

Notice of Allowance dated Jun. 28, 2021 for U.S. Appl. No. 16/884,647, 39 pages.

Office Action dated Jun. 29, 2021 for U.S. Appl. No. 16/881,556, 24 pages.

Notice of Allowance dated Aug. 4, 2021 for U.S. Appl. No. 17/200,652, 51 pages.

Office Action dated Jul. 8, 2022 for U.S. Appl. No. 16/864,892, 33 pages.

Office Action dated Jul. 15, 2022 for U.S. Appl. No. 16/864,905, 77 pages.

Office Action dated Sep. 1, 2022 for U.S. Appl. No. 16/944,094, 25 pages.

Office Action dated Jul. 21, 2022 for U.S. Appl. No. 17/070,029, 68 pages.

Notice of Allowance dated Aug. 24, 2022 for U.S. Appl. No. 17/152,544, 55 pages.

Office Action dated Sep. 15, 2022 for U.S. Appl. No. 17/383,425, 61 pages.

Phaujdar, "Understanding Event Streams—A Comprehensive Guide 101_ Learn Hevo" [https://hevodata.com/learn/understanding-event-streams/] (Feb. 17, 2021) (Year: 2021).

Dhanushka, "Understanding Kafka Topic Partitions" [https://medium.com/event-driven-utopia/understanding-kafka-topic-partitions-ae40f80552e8]—(Mar. 28, 2021) (Year: 2021).

Splunk, "Comparing Pulsar and Kafka" [https://www.splunk.com/en_us/blog/it/comparing-pulsar-and-kafka-how-a-segment-based-architecture-delivers-better-performance-scalability-and-resilience.html]—(Dec. 5, 2017) (Year: 2017).

Office Action dated Sep. 30, 2022 for U.S. Appl. No. 17/408,344, 66 pages.

Office Action dated Oct. 1, 2021 for U.S. Appl. No. 17/127,724, 41 pages.

Notice of Allowance dated Dec. 15, 2021 for U.S. Appl. No. 17/064,747, 54 pages.

Office Action dated Nov. 10, 2021 for U.S. Appl. No. 16/944,089, 75 pages.

Kleppmann, Making Sense of Stream Processing—The Philosophy Behind Apache Kafka and Scalable Stream Data Platforms; Mar. 4, 2016; retrieved from [https://hashingit.com/elements/research-resources/2016-03-04-making-sense-of-stream-processing.pdf] on Nov. 5, 2021, (Year: 2016), 183 pages.

Notice of Allowance dated Feb. 4, 2022 for U.S. Appl. No. 16/915,762, 57 pages.

Office Action dated Oct. 1, 2021 for U.S. Appl. No. 16/915,762, 57 pages.

Office Action dated Jan. 21, 2022 for U.S. Appl. No. 16/864,892, 26 pages.

Notice of Allowance dated Feb. 24, 2022 for U.S. Appl. No. 17/038,079, 55pgs.

Azhar et al., "Efficient selection of access control systems through multi criteria analytical hierarchy process", IEEE, doi: 10.1109/ICET.2012.6375419, 2012, pp. 1-8. (Year: 2012).

Rox et al., "Construction and Deconstruction of Hierarchical Event Streams with Multiple Hierarchical Layers", IEEE, doi: 10.1109/ECRTS.2008.13, 2008, pp. 201-210. (Year: 2008).

Notice of Allowance dated Feb. 18, 2022 for U.S. Appl. No. 17/083,145, 70 pgs.

Akidau et al., "MillWheel: Fault-Tolerant Stream Processing at Internet Scale" Proceedings of the VLDB Endowment, vol. 6, No. 11, 2013, 12 pages.

Akidau et al., "The Dataflow Model: A Practical Approach to Balancing Correctness, Latency, and Cost in Massive-Scale, Unbounded, Out-of-Order Data Processing" Proceedings of the VLDB Endowment, vol. 8, No. 12, 2015, 12 pages.

"Execution Model" [https://beam.apache.org/documentation/runtime/model/]. The Apache Software Foundation. Retrieved Aug. 26, 2020, 5 pages.

"Apache Beam Programming Guide" [https://beam.apache.org/documentation/programming-guide/]. The Apache Software Foundation. Retrieved Aug. 26, 2020, 69 pages.

"What is Apache Flink?—Applications" [https://flink.apache.org/flink-applications.html#building-blocks-for-streaming-applications]. The Apache Software Foundation. Copyright 2014-2019, retrieved Aug. 26, 2020, 7 pages.

"What is Apache Flink?—Architecture" [https://flink.apache.org/flink-architecture.html]. The Apache Software Foundation. Copyright 2014-2019, retrieved Aug. 26, 2020, 3 pages.

"Stateful Function—Event-driven Application on Apache Flink" [https://flink.apache org/stateful-functions.html]. The Apache Software Foundation. Copyright 2014-2019, retrieved Aug. 26, 2020, 8 pages.

"What is Apache Flink?—Operations" [https://flink.apache.org/flink-operations html]. The Apache Software Foundation. Copyright 2014-2019, retrieved Aug. 26, 2020, 3 pages.

"Use Cases" [https://flink.apache.org/usecases.html]. The Apache Software Foundation. Copyright 2014-2019, retrieved Aug. 26, 2020, 5 pages.

"Introduction" [http://kafka.apache.org/intro]. The Apache Software Foundation. Copyright 2017, retrieved Aug. 26, 2020, 6 pages.

(56) References Cited

OTHER PUBLICATIONS

"Apache Kafka Quickstart" [http://kafka.apache.org/quickstart]. The Apache Software Foundation. Copyright 2017, retrieved Aug. 26, 2020, 6 pages.

"Use Cases" [http://kafka.apache.org/uses]. The Apache Software Foundation. Retrieved Aug. 26, 2020, 3 pages.

"Architecture Overview" [pulsar.apache.org/docs/en/concepts-architecture-overview/]. The Apache Software Foundation Copyright 2020, retrieved Aug. 26, 2020, 11 pages.

"Messaging" [pulsar.apache.org/docs/en/concepts-messaging/]. The Apache Software Foundation. Copyright 2020, retrieved Aug. 26, 2020, 32 pages.

"Pulsar Overview" [pulsar.apache.org/docs/en/concepts-overview/]. The Apache Software Foundation. Copyright 2020, retrieved Aug. 26, 2020, 2 pages.

Office Action dated Jan. 29, 2021 for U.S. Appl. No. 16/256,083, 42 pages.

Non-Final Office Action received for U.S. Appl. No. 17/152,558, dated Dec. 7, 2022, 59 pages.

Notice of Allowance received for U.S. Appl. No. 16/864,905, dated Nov. 30, 2022, 347 pages.

Tony Tung et al., "Topology Dictionary for 3D Video Understanding", IEEE Transactions on Pattern Analysis and Machine Intelligence (vol. 34, Issue: 8, Aug. 2012), Dec. 2011, pp. 1645-1657.

A. Bulut et al., "Distributed data streams indexing using content-based routing paradigm", 19th IEEE International Parallel and Distributed Processing Symposium, Apr. 2005, pp. 1-10.

Notice of Allowance received for U.S. Appl. No. 17/070,029, dated Dec. 2, 2022, 36 pages.

Non-Final Office Action received for U.S. Appl. No. 17/223,263, dated Nov. 28, 2022, 64 pages.

Non-Final Office Action received for U.S. Patent Application U.S. Appl. No. 17/337,940, dated Dec. 30, 2022, 68 pages.

Notice of Allowance dated Nov. 15, 2022 for U.S. Appl. No. 16/864,892, 48 pages.

Notice of Allowance dated Nov. 23, 2022 for U.S. Appl. No. 17/408,344, 35 pages.

Notice of Allowance dated Nov. 17, 2022 for U.S. Appl. No. 16/944,094, 23 pages.

Office Action dated Feb. 10, 2023 for U.S. Appl. No. 17/145,588, 78 pages.

Notice of Allowance received for U.S. Appl. No. 17/383,425, dated Feb. 1, 2023, 37 pages.

Non Final Office Action received for U.S. Appl. No. 17/976,574 dated Mar. 2, 2023, 55 pages.

Notice of Allowance received for U.S. Appl. No. 17/337,940 dated Mar. 1, 2023, 70 pages.

Notice of Allowance received for U.S. Appl. No. 17/223,263, dated Apr. 6, 2023, 32 pages.

* cited by examiner

STORING AN ORDERED ASSOCIATIVE ARRAY OF PAIRS USING AN APPEND-ONLY STORAGE MEDIUM

TECHNICAL FIELD

The subject application generally relates to data storage and retrieval, and, for example, to a key-value store that operates in conjunction with data storage streams and segments maintained in an append-only storage medium, and related embodiments.

BACKGROUND

Prior technology exists for storing a non-ordered associative array of pairs using append-only storage media, however, such prior technology does not support order between pairs, and so features, such as range queries and listing keys in sorted order, have remained similarly unsupported.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects described herein are generally directed towards providing an ordered associative array of pairs (e.g., a key-value store) on top of append-only storage, which among other possible uses facilitates access to data storage streams. The technologies described herein are directed to storage of a non-ordered associative array of pairs. This disclosure provides an end-to-end implementation of how to store an ordered associative array of pairs using an append-only storage medium.

Figure 17:
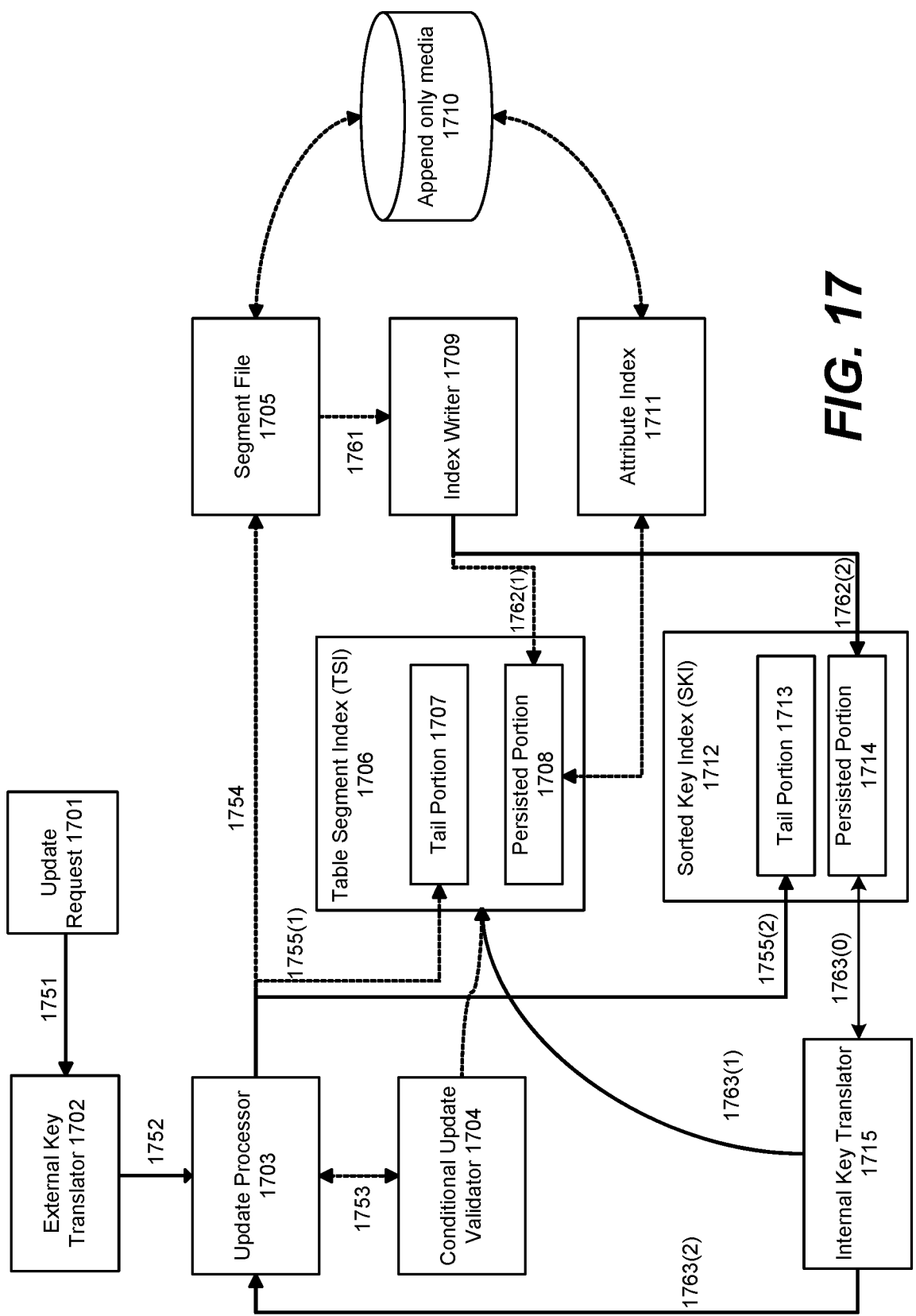
FIG. 17 illustrates an example system and method to perform updates and indexing of an ordered associative array of pairs, in accordance with various aspects and implementations of the subject disclosure.
Figure 18:
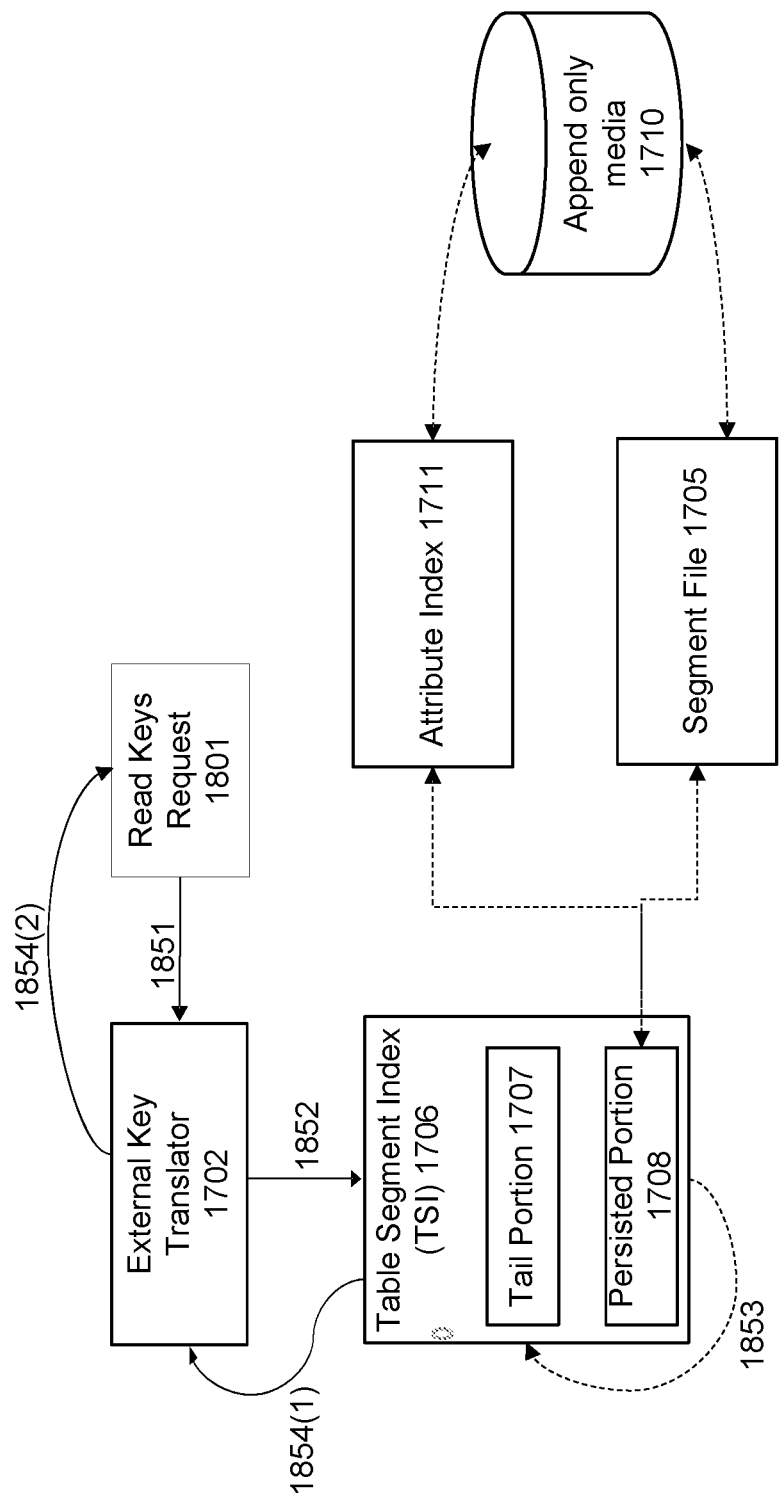
FIG. 18 illustrates an example system and method to perform read operations, in accordance with various aspects and implementations of the subject disclosure.
Figure 19:
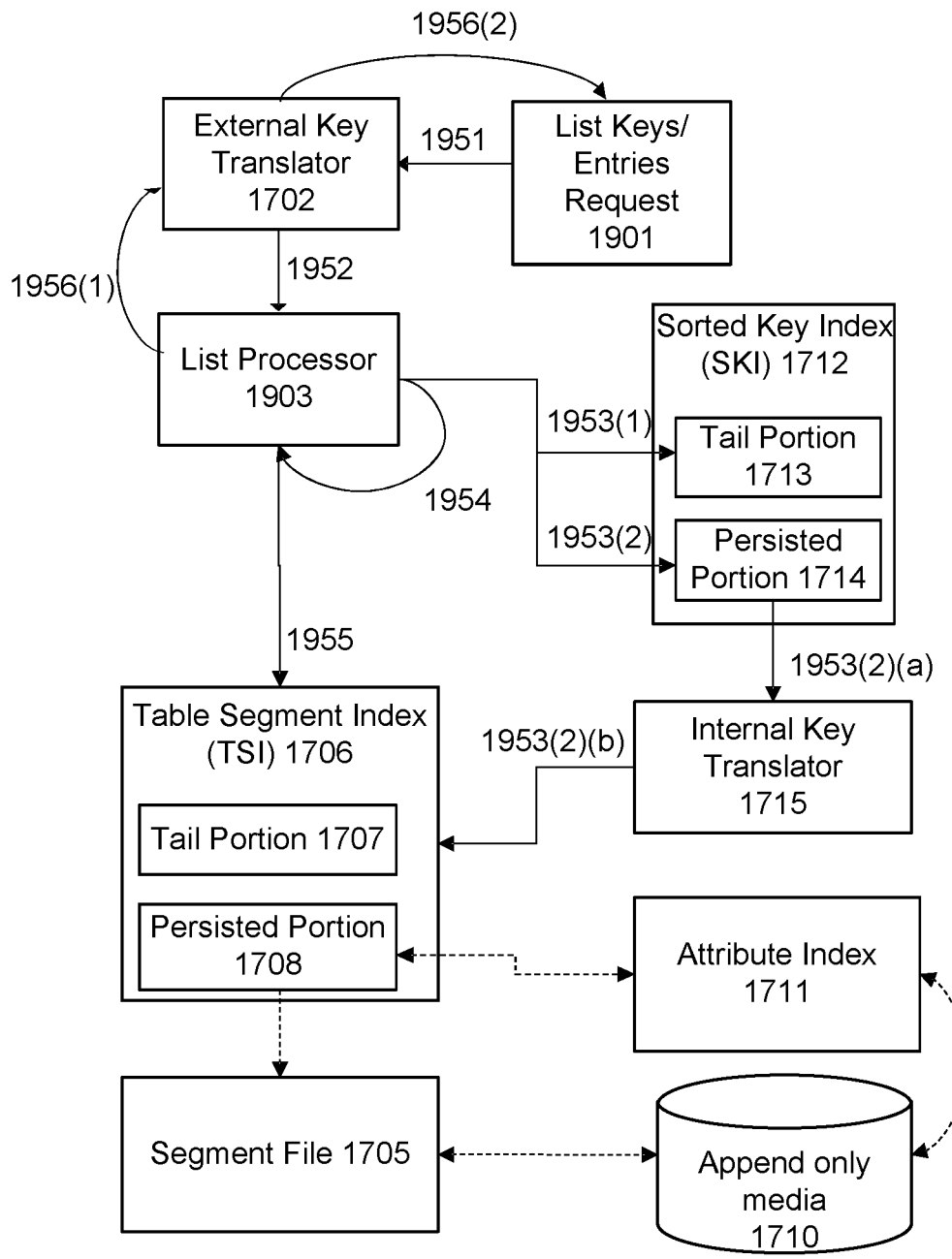
FIG. 19 illustrates an example system and method to list keys in order, in accordance with various aspects and implementations of the subject disclosure.
Figure 20:
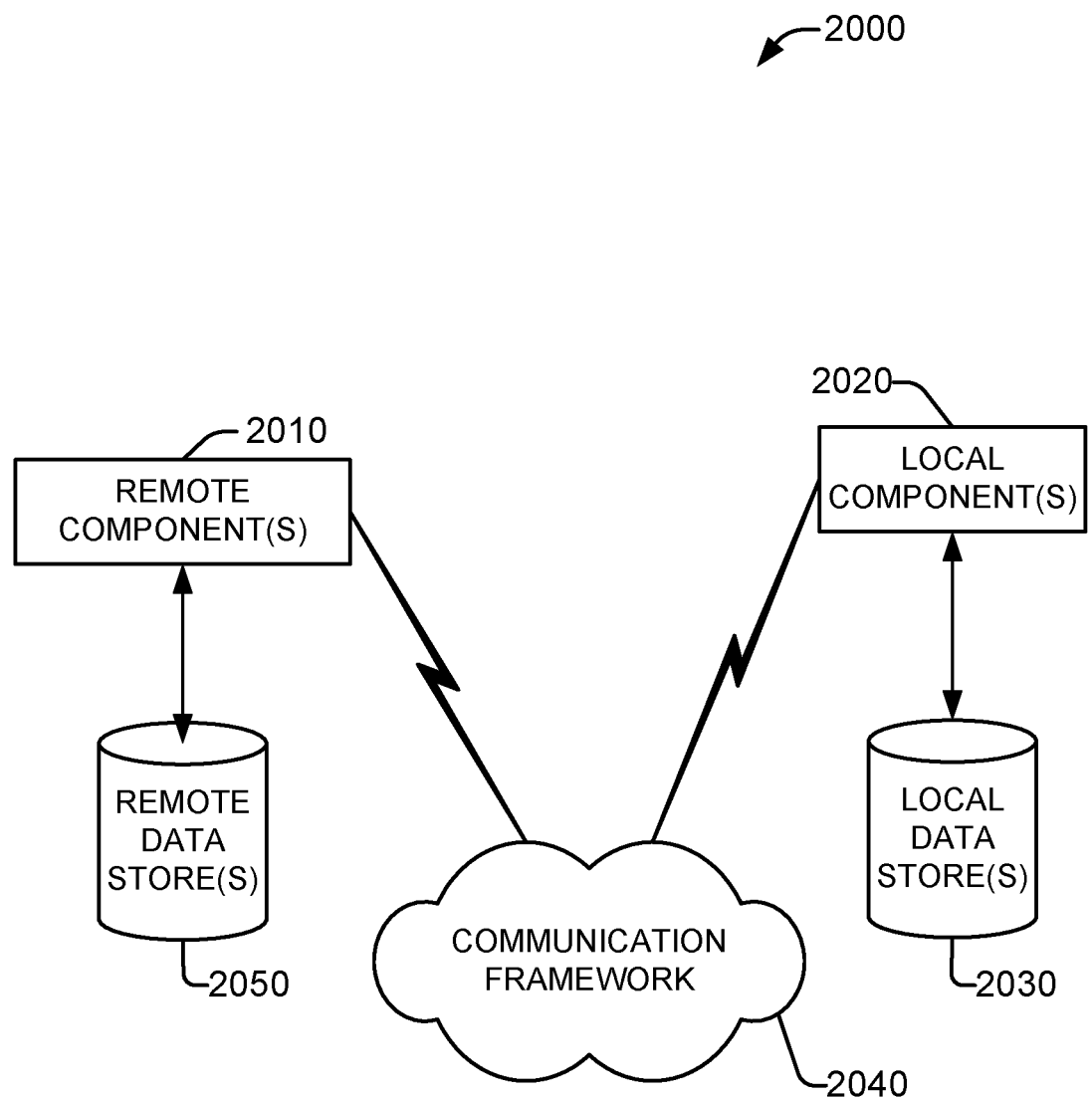
FIG. 20 depicts an example schematic block diagram of a computing environment with which the disclosed subject matter can interact, in accordance with various aspects and implementations of the subject disclosure.
Figure 21:
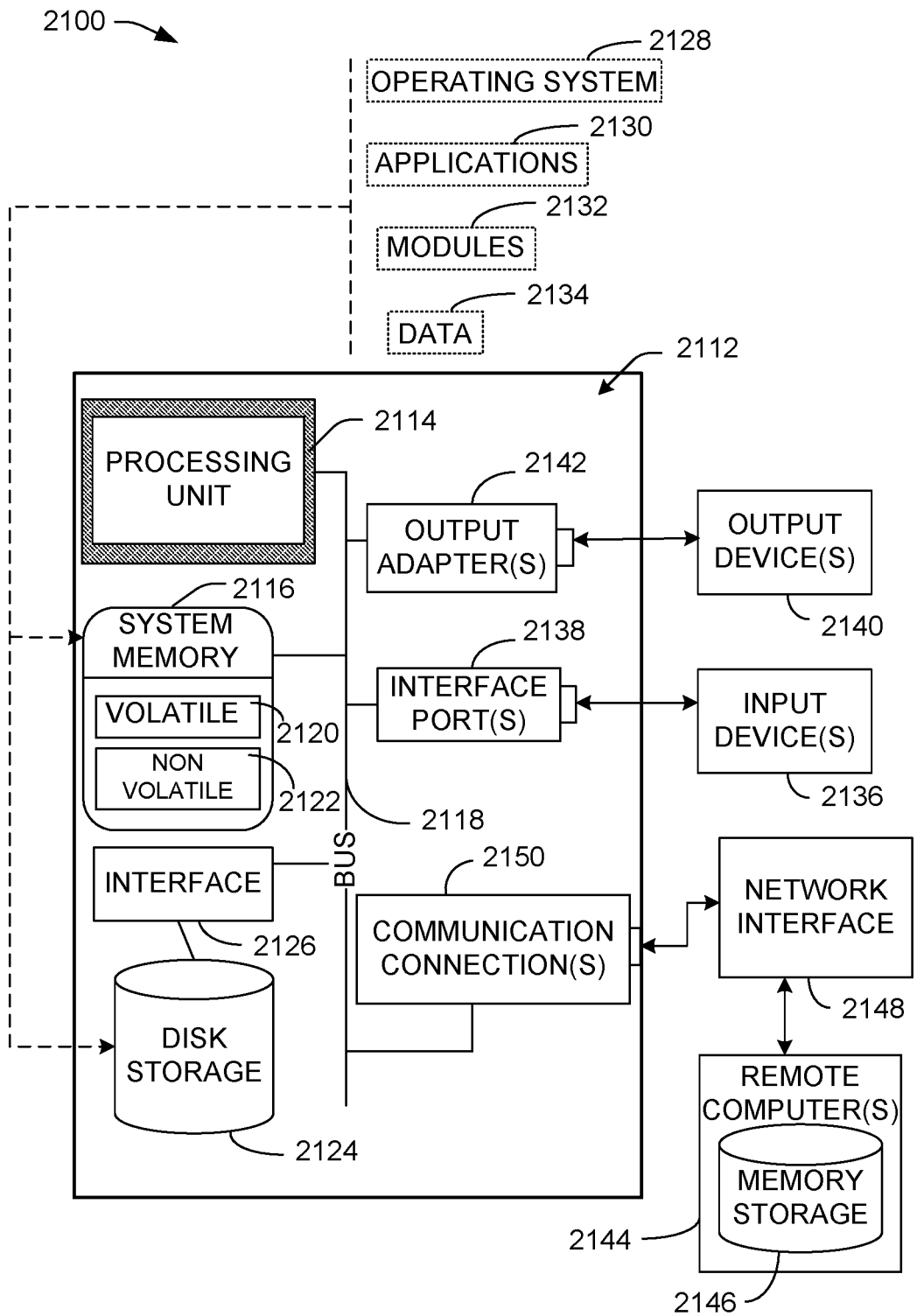
FIG. 21 illustrates an example block diagram of a computing system operable to execute the disclosed systems and methods in accordance with various aspects and implementations of the subject disclosure.

FIGS. 1-16 and corresponding description herein are directed to storage of a non-ordered associative array of pairs. FIGS. 17-19 and corresponding description herein are directed to additional aspects to support storage of ordered associative arrays of pairs. FIGS. 20-21 are directed to an example computing environment and computing system, respectively.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

With regard to FIGS. 1-16, and corresponding description below, FIGS. 1-16 are generally directed towards providing a non-ordered associative array of pairs (e.g., a key-value store) on top of append-only storage, which among other possible uses facilitates access to data storage streams. This can, for example, provide significant benefits in data searching and snapshot technologies, among other applications. Other aspects comprise attaching supplemental information to events and storing very large objects (e.g., blobs of data greater than one gigabyte in size), by splitting such objects into smaller fragments.

In one aspect, the technology can efficiently organize data in a single, non-distributed database as an associated array of key-value pairs implemented on top of a storage medium that allows only data appends (data can only be added at the end, and once written, it may not be overwritten). In the implementation of FIGS. 1-16, there is no relationship between the pairs (keys) inside the database.

In one or more implementations, both the segment file, comprising a table segment that maintains the data, and an attribute index that contains information by which a table key maps to an offset location in the table segment where the value is stored can be implemented in an append only storage. For example, the attribute index can contain extended attributes maintained in an append-only, shadow segment file.

The implementation(s) described herein are non-limiting examples, and variations to the technology can be implemented. For instance, many of the examples herein are based on an attribute index that is accessed via a particular hash function and collision handling scheme, however other hash functions and/or collision handling schemes can be used. As such, any of the embodiments, aspects, concepts, structures, functionalities, implementations and/or examples described herein are non-limiting, and the technology may be used in various ways that provide benefits and advantages in data storage in general.

Figure 1:
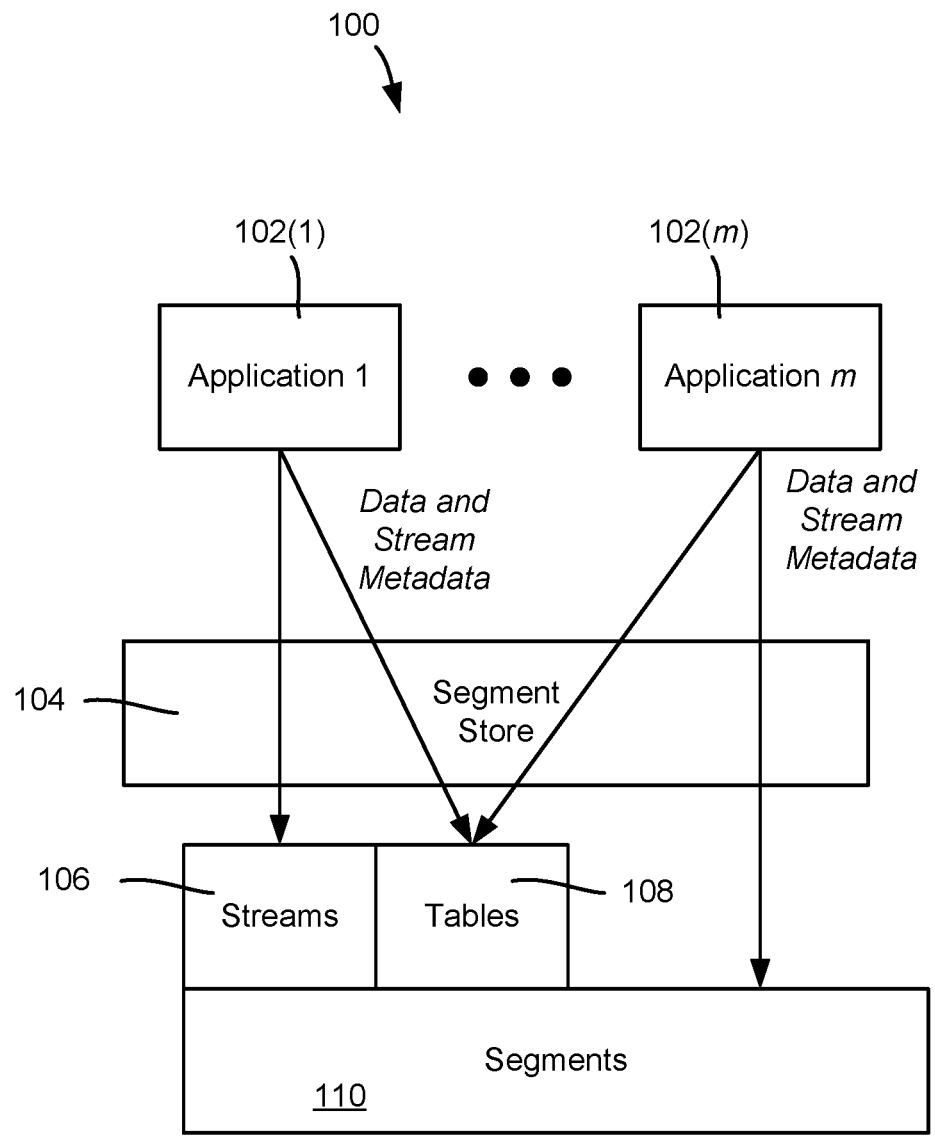
FIG. 1 is an example block diagram representation of a streaming filesystem in which an append only storage medium is used, along with tables, in accordance with various aspects and implementations of the subject disclosure.

Turning to the drawings, FIG. 1 shows a data storage system 100, by which applications 102(1)-102(m) can access streamed data through a segment store 104. In general, the segment store 104 can receive and process requests directed to a table segment. Data in streams 106, tables 108 and segments 110 are represented in FIG. 1 as being accessible via the segment store 104.

Figure 2:
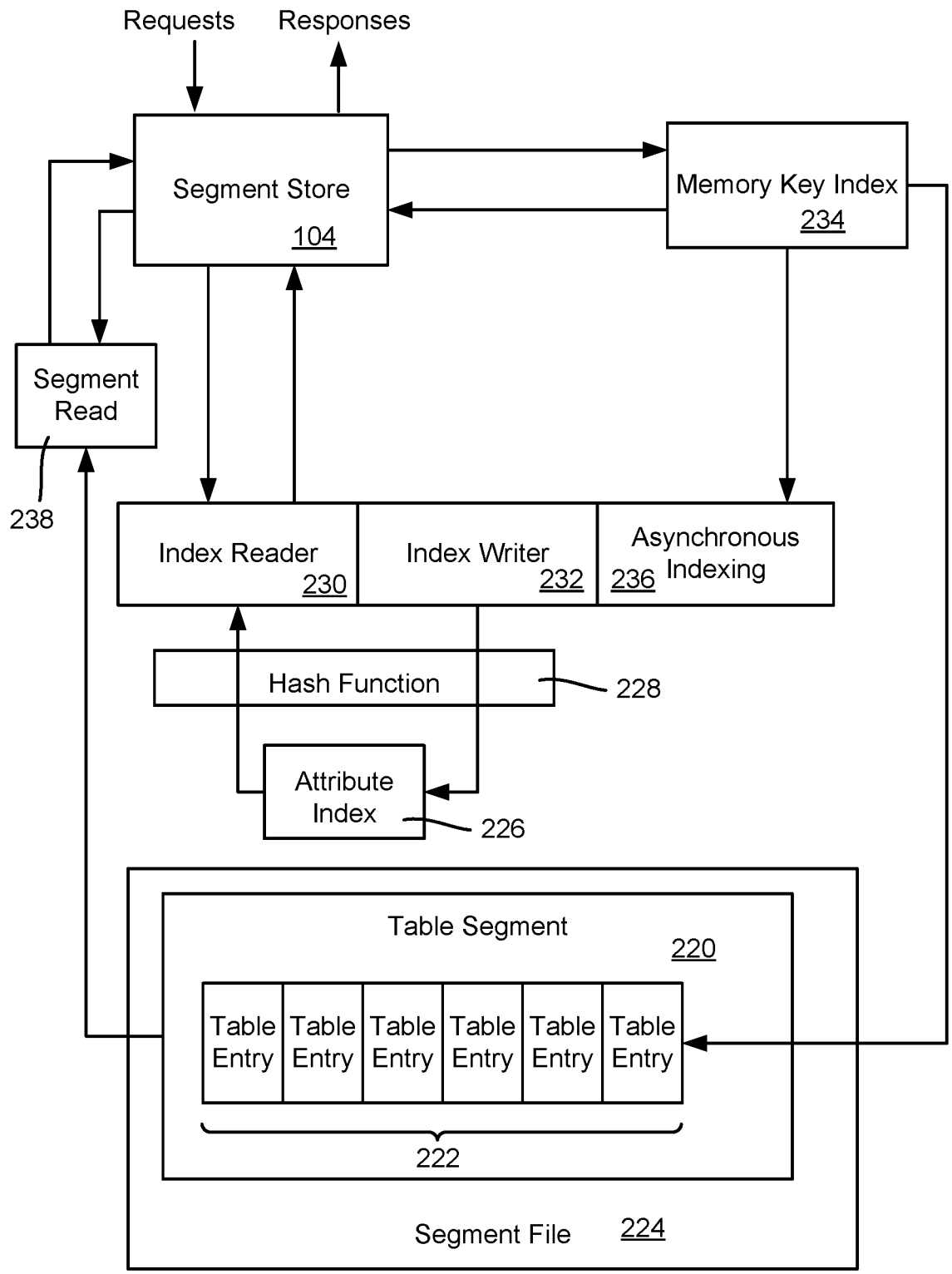
FIG. 2 is an example block diagram representation of components used to implement a key-value store in an append only storage medium, in accordance with various aspects and implementations of the subject disclosure.

FIG. 2 shows various components coupled to the segment store 104 to provide an example key-value store. Update requests comprising updates (table keys and corresponding values to write) and read requests (table keys requesting corresponding values) to the segment store 104 can result in responses to the calling application/user.

In FIG. 2, a table segment 220 can comprise a non-distributed associative array of keys that point to values, with the property that each key can appear only once. The table segment contains table entries 222, with each table entry comprising tuple {Key, Value, Version} that exists in the table segment. The segment file 224, comprising one or more table segments including the table segment 220, can be implemented in an append-only storage medium. Note that as described herein, the version information can correspond to an always increasing generation number, and can be maintained so that multiple writers (who can specify a compare version value) do not overwrite a more recent update with another update.

An attribute index 226 can map table keys to offset locations in a table segment, such as the table segment 220. Because table keys can have arbitrary lengths, the attribute index 226 can contain hash-mapped values based on a hash function 228. In one or more implementations, the attribute index 226 can comprise an associative array of 16-byte keys to 8-byte values, which can be stored in an append-only storage medium, e.g., an extended attribute shadow segment file. Access to the attribute index can be performed via an index reader 230 and an index writer 232 (e.g., an API).

For efficiency, a memory key index 234 can maintain a view of a subset of a table segment index, that is, data representing a number of {key, offset location} pairs, such as those most recently used. In general, the memory key index 234 can avoid needing to access the attribute index 226 on many read and update requests, as described herein. However, because data maintained in the memory key index 234 can be stored in volatile memory, such data is subject to loss once the process terminates. Recovery can be a resource-consuming operation and is thus not particularly desirable. Accordingly, asynchronous indexing 236 can be performed, which can operate in the background to update the attribute index 226 based on the data in the memory key index 234. Note that the index writer 232 and asynchronous indexing component 236 can be the same entity, although it may be beneficial to allow another entity to write to the attribute index 226, and thus these are shown in FIG. 2 as closely coupled components.

Figure 3:
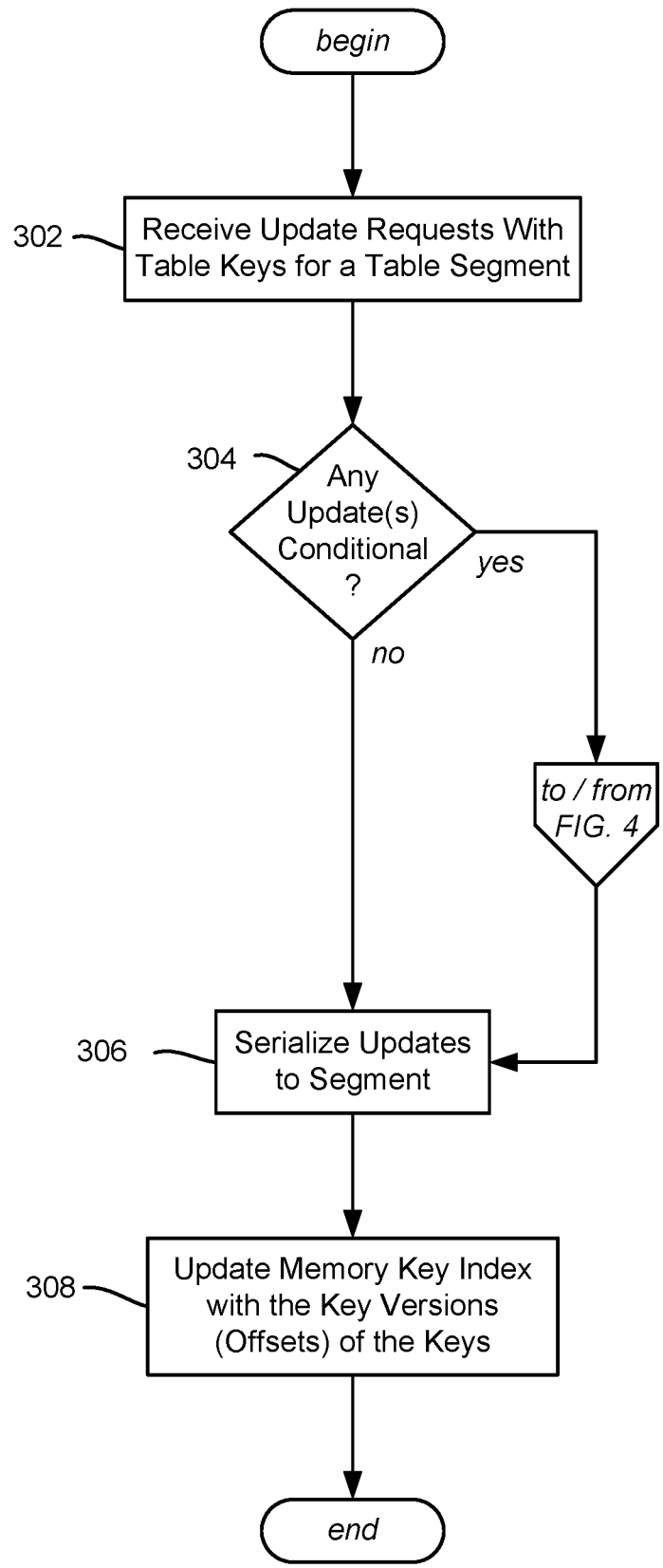
FIGS. 3 and 4 comprise a flow diagram representing the processing of updates related to a segment table, in accordance with various aspects and implementations of the subject disclosure.

Turning to updates to a table segment, for storage on non-ordered information, consider that a set of updates SU (each in the form {Key, Value, CompareVersion}) can be received for the table segment 220. This is represented in FIG. 3 by operation 302. Note that updates can be made in a batch of one or more updates at a time.

Operation 304 evaluates whether the set of updates is conditional, meaning that at least one of the updates has its CompareVersion value set. If so, the update process branches to FIG. 4, operation 402. Note that it is feasible to have an unconditional update that just overwrites (actually appends a new value and adjusts the offset) the value of the key-value pair without considering version information.

Consider that in this example at least one of the updates has its CompareVersion value set, whereby the process branches to operation 402 which represents collecting those updates in the update set/batch that has a CompareVersion value set; this set may be the entire set S, or a proper subset CU of the set S.

At operation 404, if there are other pending conditional update(s) to any table key in the subset CU, then operation 404 can wait for the completion. Once none are pending, at operation 406, a first conditional update can be selected for update processing. Note that non-conditional updates, including for the same key, can execute in parallel, in which case each can update the value of the key (possibly for a very short amount of time), with one value prevailing as the final value. However, conditional updates can only overwrite the value of a key if the updater proves that the updater knows the previous value of the key (which is done by providing a version with each key update). Conditional updates cannot be executed in parallel, because the outcome of the previous update needs to be known before making another change. Because the version returned with each update cannot be guessed by the updater beforehand, conditional updates can be serialized. Any concurrent access results in at most one update executing successfully and the others failing.

Accordingly, conditional updates are validated. Operation 408 represents querying the memory key index 234 with the table key (it is feasible to use some hash function or the like to quickly locate the table segment offset location for the table entry, from which the {table key, value, version} is found. Note that it is feasible for the memory key index 234 to contain the {table key, value, version} data in addition to the segment table offset location, e.g., for efficiency, although for purposes of description herein, consider that the memory key index only contains {table key, offset} pairs (possibly arranged via some hash function on the table key). If not present as evaluated at operation 410, the value and version value can be looked up in the attribute index via the index reader 230 (FIG. 2) (with the offset location, and if appropriate the table, key, value and version added to the memory key index 234).

Once the version information is obtained, operation 414 can either allow (and perform) the update via operation 416 or disallow (operation 418) the update based on whether the obtained version value is what was expected (versus the compare version value). Operations 420 and 422 can repeat the process for other conditional updates.

Returning to FIG. 3, for those updates which are allowed, including any non-conditional updates, operation 306 serializes the updates' data to the segment. Operation 308 updates the memory key index 234 with the offset location of each key in the set at which the update was serialized.

Figure 5:
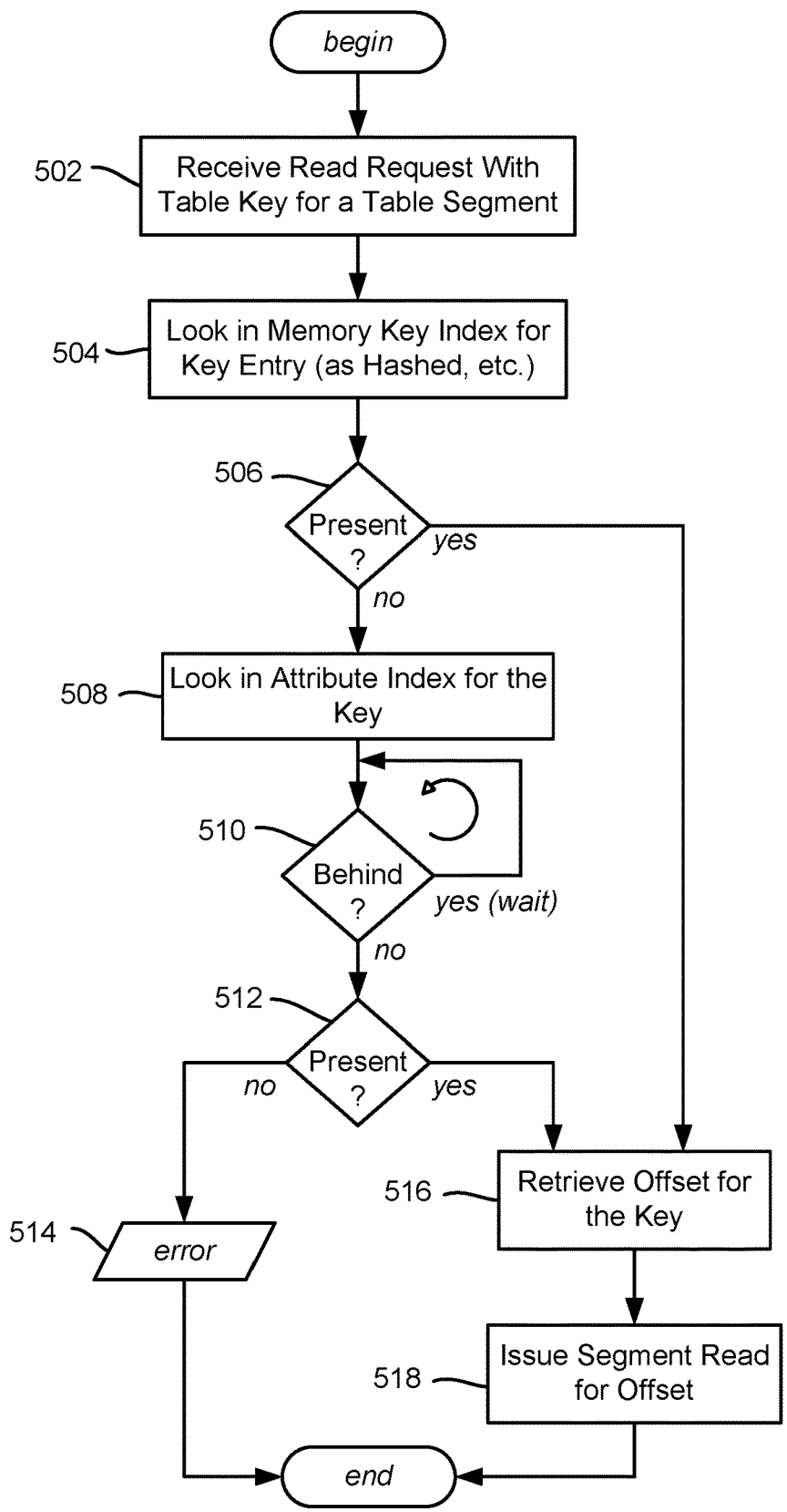
FIG. 5 is a flow diagram representing the processing of read requests related to a segment table, in accordance with various aspects and implementations of the subject disclosure.

Turning to read requests, consider that a set of table keys SR can be received for the table segment 220 requesting a read operation. This is represented in FIG. 5, operation 502. Note that reads can be performed in parallel, at least to an extent, and thus FIG. 5 summarizes an example read process for a single table key read request.

Operation 504 looks for the table key in the memory key index 234 (FIG. 2). If present as evaluated at operation 506, the key's latest offset can be retrieved at operation 516. Otherwise, the latest offset for the table key can be looked up in the attribute index 226 (FIG. 2), which as described below, can involve hashing the table key to locate the offset location and retrieve the offset (operation 516). Note that if the attribute index 226 is behind in terms of indexing (due to asynchronous indexing (also described below)), the operation can be blocked via operation 510 until the asynchronous indexing 236/index writer 232 notifies the system that the data has been properly indexed. Further note that if the table key that is provided does not have an entry in the memory key location or the attribute index, some error code or the like can be returned via operation 512 and 514.

Once the offset is obtained at operation 516, operation 518 can issue a segment read (block 238, FIG. 2) at the corresponding offset, which can retrieve the data corresponding to the offset. A segment read, for example, can be an API call or the like to a process that returns data from a table entry given the offset location. To reiterate, the read operation of FIG. 5 can be part of a batched read request, at least part of which can be performed in parallel.

Figure 6:
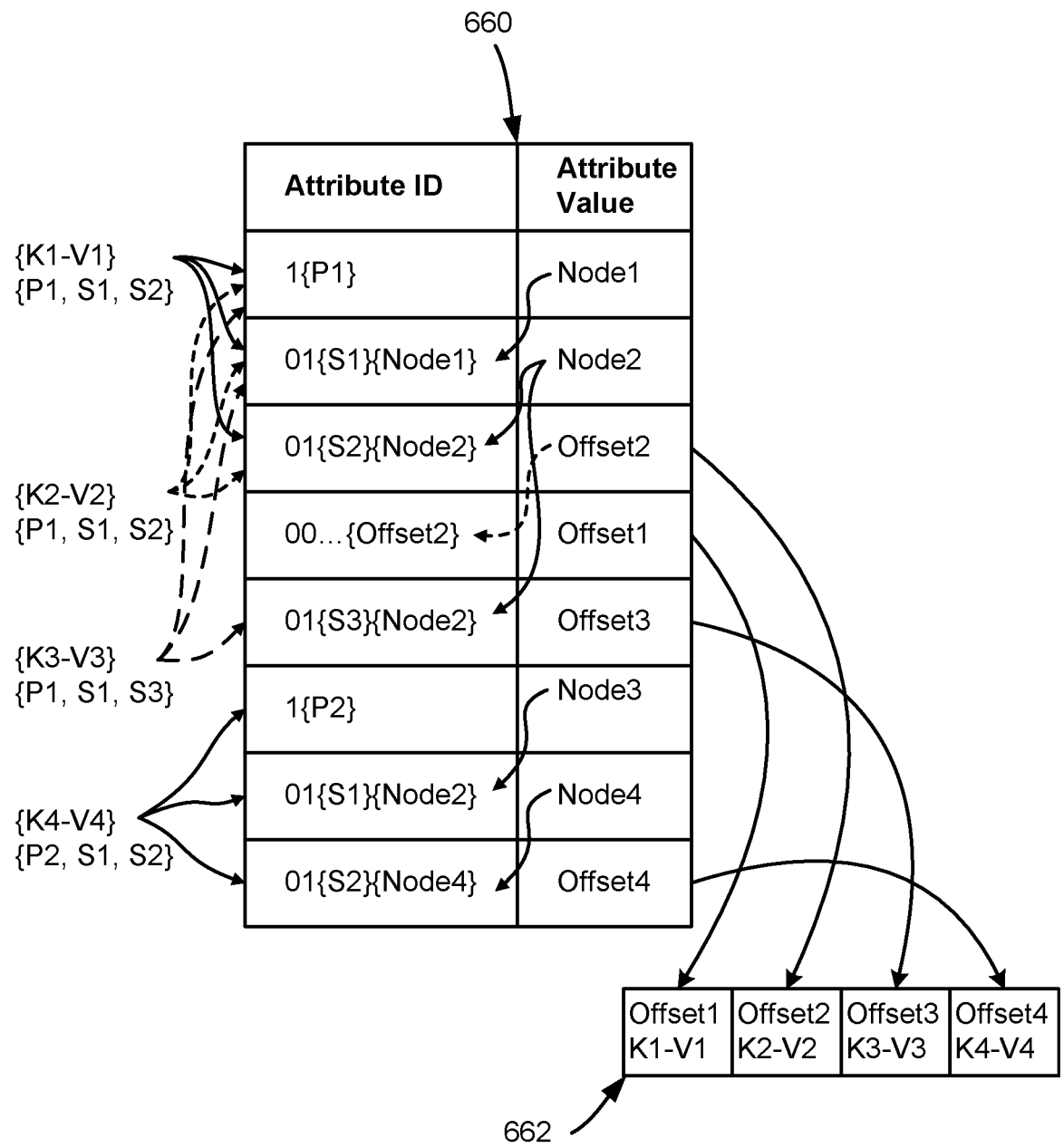
FIG. 6 is a representation of an example data structure in which an attribute index that maintains offset values corresponding to segment table keys is implemented, in accordance with various aspects and implementations of the subject disclosure.

Turning to aspects of the attribute index and its structure, in one or more implementations, the attribute index 226 can be stored in an append-only attribute index file as an associative array of 16-byte keys to 8-byte values. In one or more implementations, the attribute index can comprise an append-only B+Tree implementation. FIG. 6, described below, shows one such attribute index implementation 660, with offsets to a segment layout 662.

For the upper layers, the attribute index 226 can provide a mapping between a table key to an offset location in the corresponding table segment. A table key can be an arbitrary length byte sequence, while the offset can be a fixed-size, 8-byte number. As described herein, data corresponding to the table key and the offset can fit in the 16-byte to 8-byte attribute index file.

To this end, a hashing function 228 (e.g., SHA512, which produces a sixty-four byte hash value) can be used, which produces a fixed-size byte array/resulting hash value H. In one or more implementations, the resulting hash value H can be split into a series of hash parts HP[0 . . . n]; HP[0] has 16 bytes, while HP[1] HP[n] have 12 bytes. For a sixty-four byte hash, n can thus equal four; as will be understood, this provides five hash parts, which can map to nodes of the B+tree (as needed, to avoid collisions). However, in many instances there are no collision(s), whereby not all of the hash parts, and often only the primary hash part (HP[0]), can be used. Note that instead of using hash parts, it is feasible to use a series of different hash functions.

In general, when a table key is hashed, there is a possibility of a collision with another hashed table key value. As described herein, the primary hash part (HP[0]) can be checked for such a collision with another attribute index entry. If there is no collision, then the primary hash part, corresponding to a node in the B+tree, can be used as the key to the offset in the attribute index.

Otherwise, if there is a collision at the primary hash part, then the secondary hash part can be evaluated, (HP[1]). This corresponds to a branch under the node corresponding to the primary hash part. If there is no collision, then the primary and secondary hash parts can be used to differentiate between the two (hashed representations of) segment table keys. If a collision still exists, then the next secondary hash part, HP[2] can be used in the same manner, and so on, until there is no collision, or no hash parts remain. In the (unlikely) event that no hash parts remain, a linked list comprising backpointers can be used to differentiate the corresponding table key entries in the attribute index. While link lists are inefficient, with SHA512 and 5 hash parts, linked lists are rarely, if ever, going to be needed in practice.

As can be understood, in one or more implementations, there can be three types of entries in the index attribute structure 660 for offsets, child nodes and backpointers. Various information can be used to differentiate between these different types of hash key values in the index attribute structure 660. For example, in one implementation, keys starting with bit 1 can represent a primary hash to NodeId|Offset pointer, e.g., (1{127-bit primary hash}=NodeId|Offset.

Keys starting with bits 00 can represent back-pointers as described below, e.g., (00{62-bit ignored} {Offset1})=Offset2, where Offset2 can contain the previous entry in a linked list for the hash bucket that contains the entry at offset Offset1.

Keys starting with bits 01 represent secondary hashes to NodeId|Offset pointers, e.g., (01{NodeId} {SHIndex})=NodeValue. Note that if the NodeValue starts with bit 1, the remaining bits represent the Child NodeId for the secondary hash with Index for node NodeId. If the NodeValue starts with 0, the remaining bits represent the offset within the segment where the last entry for this hash bucket exists.

Figure 7:
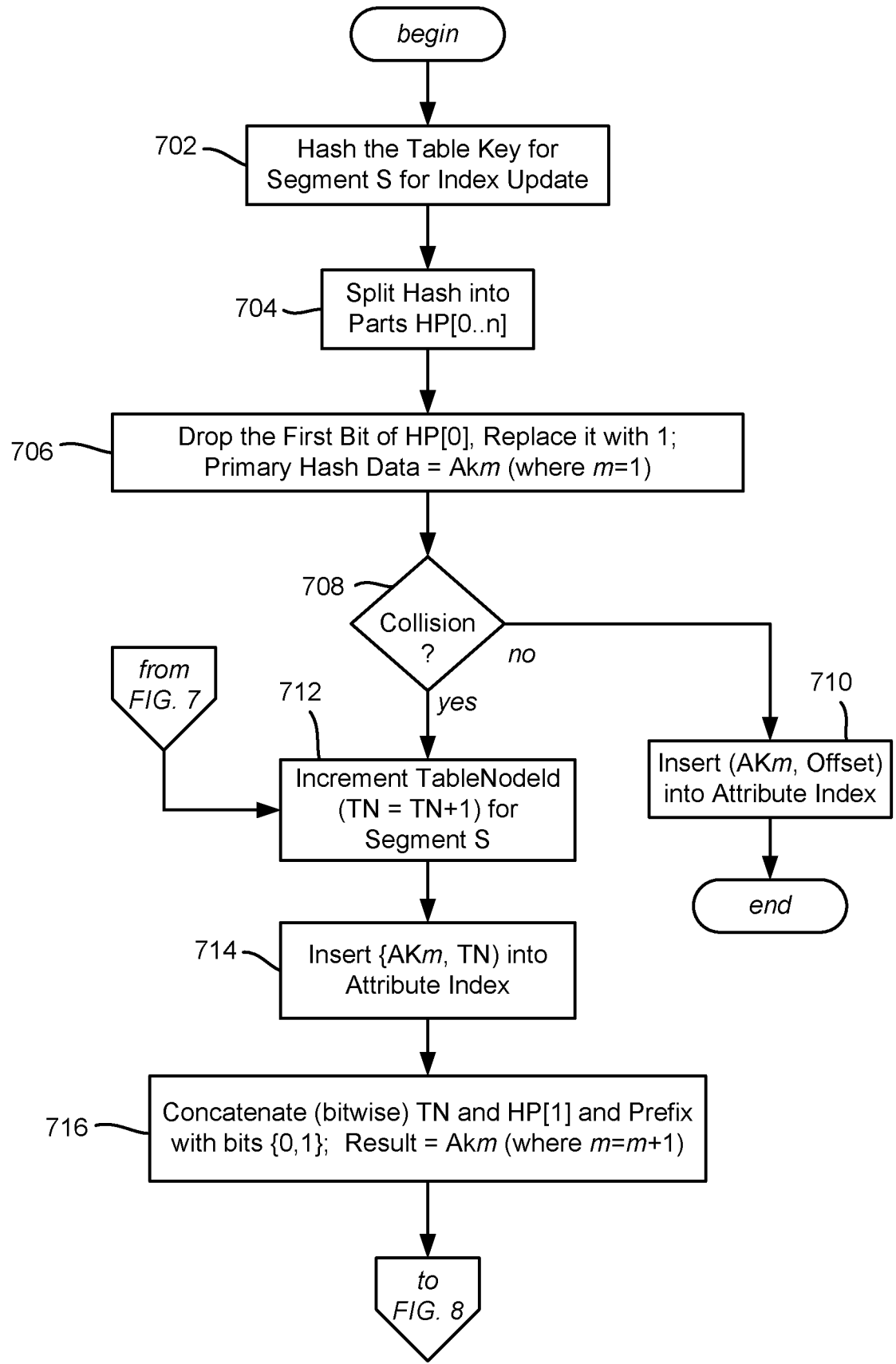
FIGS. 7 and 8 comprise a flow diagram representing the processing of updates for indexing in an attribute index, in accordance with various aspects and implementations of the subject disclosure.
Figure 8:
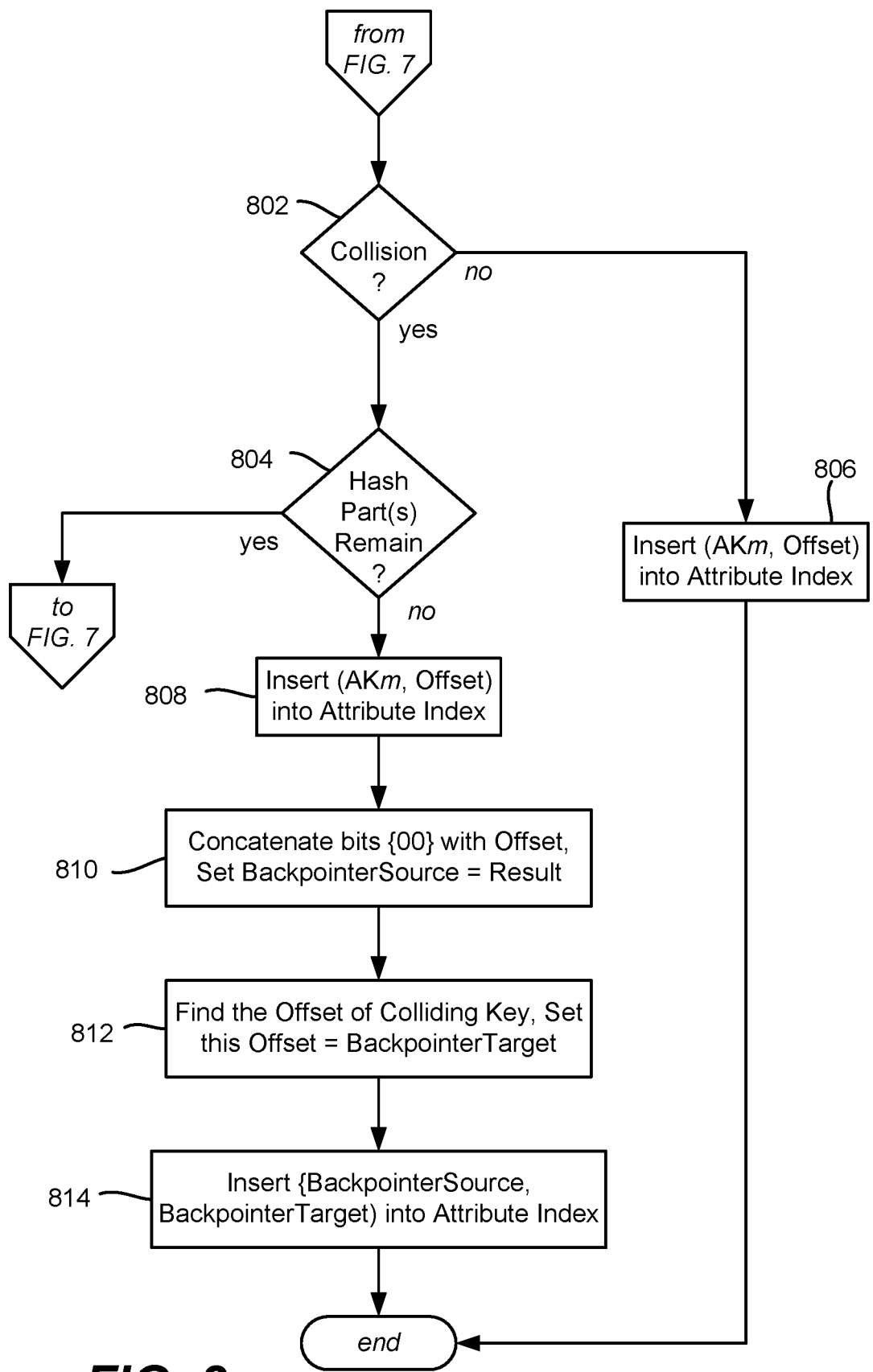
Figure 9:
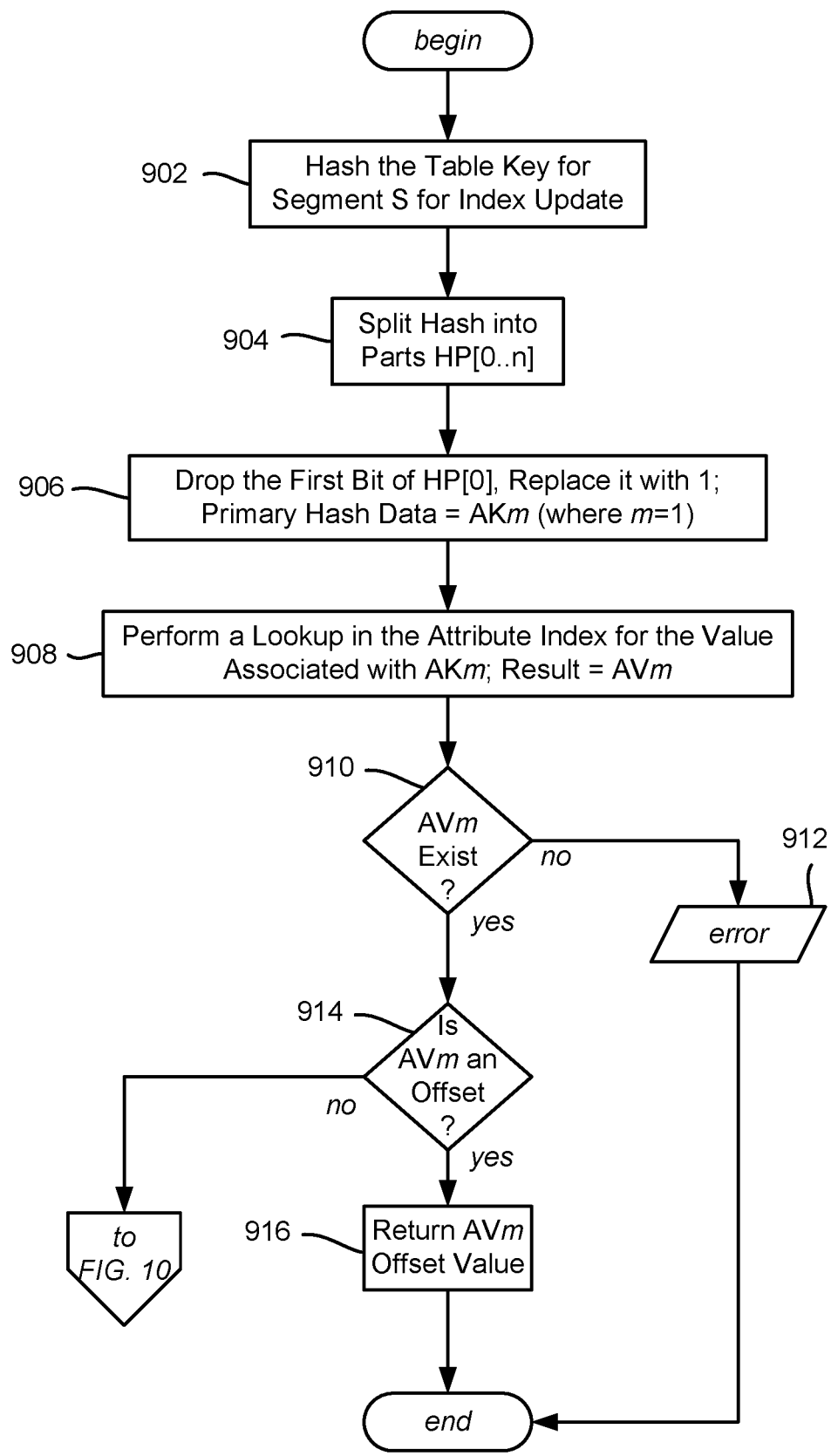
FIGS. 9-11 comprise a flow diagram representing the retrieval of offset information from an attribute index, in accordance with various aspects and implementations of the subject disclosure.

FIGS. 7-9 comprise a flow diagram showing example operations of how updates to the index can occur for a table key K, for storage on non-ordered information. FIGS. 7 and 8 generally can be followed in conjunction with the entries in FIG. 6, where FIG. 6 corresponds to an example in which three hash parts are available for differentiation, comprising a primary hash part and two secondary hash parts (which is basically identical to having one primary hash function and two secondary hash functions). Note that attribute IDs are 128 bits, while attribute values are 64 bits in one implementation.

Consider that in this example, two table keys K1 and K2 can be different, but can have the same hashes/hash parts. As will be understood, backpointers can be used to keep track of both of their latest values. Further, another key K3 partially collides with K1 and K2; these keys share the same Primary Hash and the first Secondary Hash, but have a different second secondary hash. As such, these keys share Node1 and Node2, but K3 has a different offset due to its second Secondary Hash being different. Further, K4 is totally independent of K1, K2 and K3, and thus has its own, new entries. Note that the NodeId (e.g., Node1, Node 2 and so on) is a 30-bit number that is incremented whenever a new tree node is created underneath the first level (that is, every time the process uses a secondary hash to resolve primary hash collisions).

In FIG. 7, consider that a table key K can exist at some offset location OL, and a process (such as the index writer) can update the attribute index to reflect an update. As represented in FIG. 7, an index update process can generate the hash value H (operation 702) and can split the hash value H into the hash parts HP[0 . . . n] (operation 704) as described herein.

In order to differentiate between types of index entries, operation 706 can drop the first bit of the primary hash value HP[0], and replace the dropped bit with a 1; this is set to AK1 (for AKm, where m initially equals 1).

Operation 708 evaluates for a collision, that is, whether another table key K2 shares HP(0) with the current Key K. If there is no collision, the process can insert {AK1, OL} into the attribute index and stop (recall that OL is the offset location).

If there is a collision, operation 712 can increment the TableNodeId (TN) for this table segment (starting from an initial value of zero). The key, modified via the starting one bit into AK1, can be inserted along with the table node identifier into the attribute index at operation 714.

When there is a collision and child nodes are needed, operation 716 can concatenate (bitwise) TN and HP[1] to prefix them with bits {01}, and the result can be AK2. The process can continue to operation 802 of FIG. 8.

At operation 802 of FIG. 8, the process can check for a collision between the secondary hash value, which in the current state is the first secondary hash value of table key K and the first secondary hash value of table key K2. If no other Key K2 shares HP[0] and HP[1] with the key K, then operation 806 can inserts {AKm, OL} (where currently m=2 in this example) into the attribute index, and the process ends.

If there is still a collision, operation 804 can evaluate whether hash parts remain that can differentiate between the colliding table keys. If hash parts remain, the process repeats from operation 712 of FIG. 7, this time with m=3, and so on.

If no hash parts remain, that is, HP[n] is reached and there are no more hash parts to use in an attempt to differentiate, operation 808 can insert {AK2, OL} into the attribute index. At this point there exists another table Key K2 that hares HP[0] . . . HP[n] with the table Key K. Because there are no more hash parts to differentiate between them, a linked list is used.

To this end, operation 810 can concatenate bits (00) with the offset location OL, with the result set to BackpointerSource. Operation 812 can find the offset corresponding to table key K2 that collides with Key K (they share all hash part components), with this K2 offset location set to BackpointerTarget. Operation 814 can insert {BackpointerSource, BackpointerTarget) into the attribute index.

Figure 10:
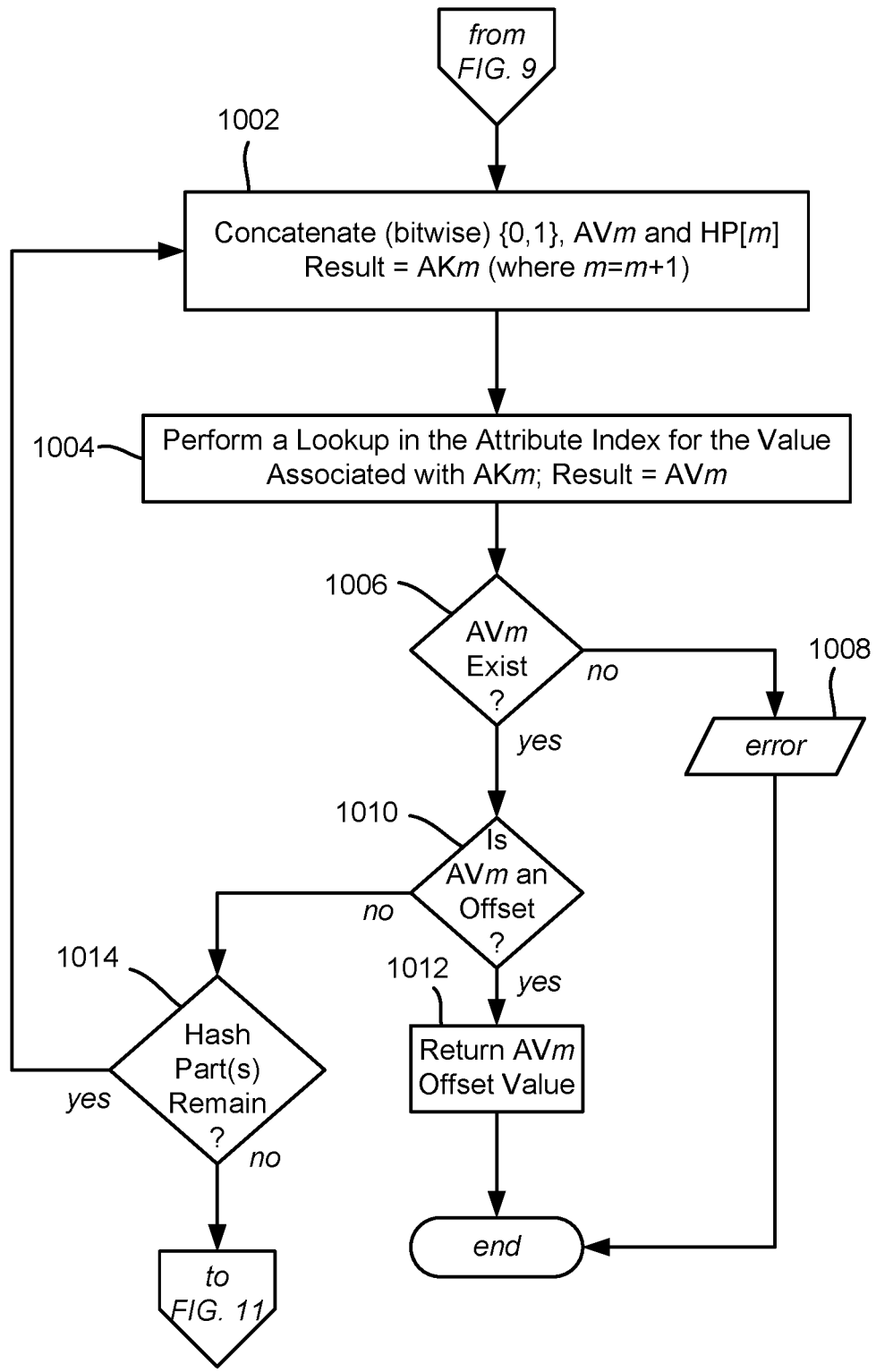
Figure 11:
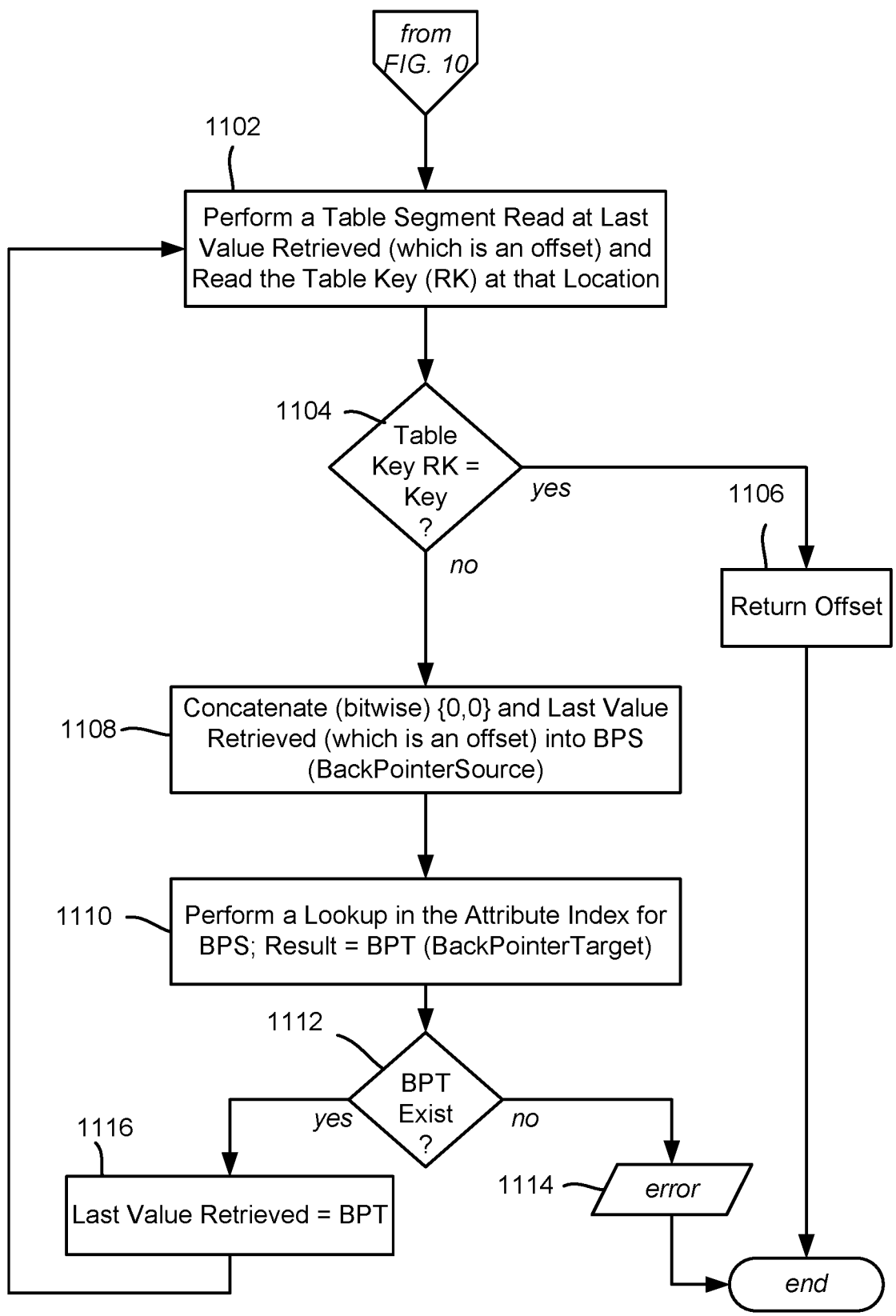

Turning to index retrievals for storage of non-ordered information, as generally represented in the example operations of FIGS. 9-11, consider that a table key K is provided and can be looked up in the index to find its most recent offset location in the corresponding table segment.

With reference to FIG. 9, operation 902 can generate the hash value H, and operation 904 can split the hash value into its component hash parts HP[0 . . . n] as described above.

Operation 906 can drop the first bit of HP[0], and replace it with 1; the result can be set to AK1 (AKm, where for now m=1). Operation 908 can then perform a lookup in the attribute index for the value associated with AK1, which can be set to AV1 (AVm, where for now m=1). If AVm does not exist, there is no such entry and the process ends (e.g., with an error at operation 912 to notify the caller that no such entry was found).

If instead AVm does exist, and the value is an offset in the table segment, then operation 915 can return the offset value and stop. Otherwise the process can continue to operation 1002 of FIG. 10, which means there was a collision when updating the index.

Operation 1002 of FIG. 10 can bitwise concatenate (01), AV1 and HP[1] into AK2 (AKm+1) and can perform a lookup in the attribute Index for AKm (set to AV2 because at present in this example m=2). If AV2 does not exist, operation 1008 can end the process with an error or the like to indicate that no such value was found for the given table key.

If AV2 does exist, and the value is an offset in the table segment as evaluated at operation 1010, operation 1012 can return the offset value OL and the process can end. Otherwise, if hash parts remain (HP[n] is not yet reached), operation 1014 can branch back to operation 1002. If no hash parts remain, the process can continue at operation 1102 of FIG. 11.

If no hash parts remain, the linked list can be accessed to determine the offset location for the table key K. Operation 1102 can perform a table segment read at the last value retrieved (which is an offset) and can read the table key (RK) at that location. If RK matches K at operation 1104, then the offset result is found, and operation 1106 can return the offset value and the process can end.

If the keys do not match, operation 1108 can bitwise concatenate (00) and the last value retrieved (which was an offset) into backpointer source (BPS). Operation 1110 can perform a lookup in the attribute Index for the backpointer source (BPS), which can be set to backpointer target (BPT). Note that if BPT does not exist, operations 1112 and 1114 can end the process with a suitable error.

Otherwise, operation 1112 can return to operation 1102, passing the BPT to it as the last value retrieved. The linked list can be followed until a match with the table key is found (or no further backpointer exists).

As can be seen, index updates and retrievals to the attribute index can use a multi-part hashing scheme that maps to nodes in the attribute index, yet have a failsafe linked list mechanism in the unlikely event that two different table keys have the same hash value. Note that instead of the multi-part hashing scheme, the use of multiple different hash functions can similarly map to attribute index nodes.

Figure 4:
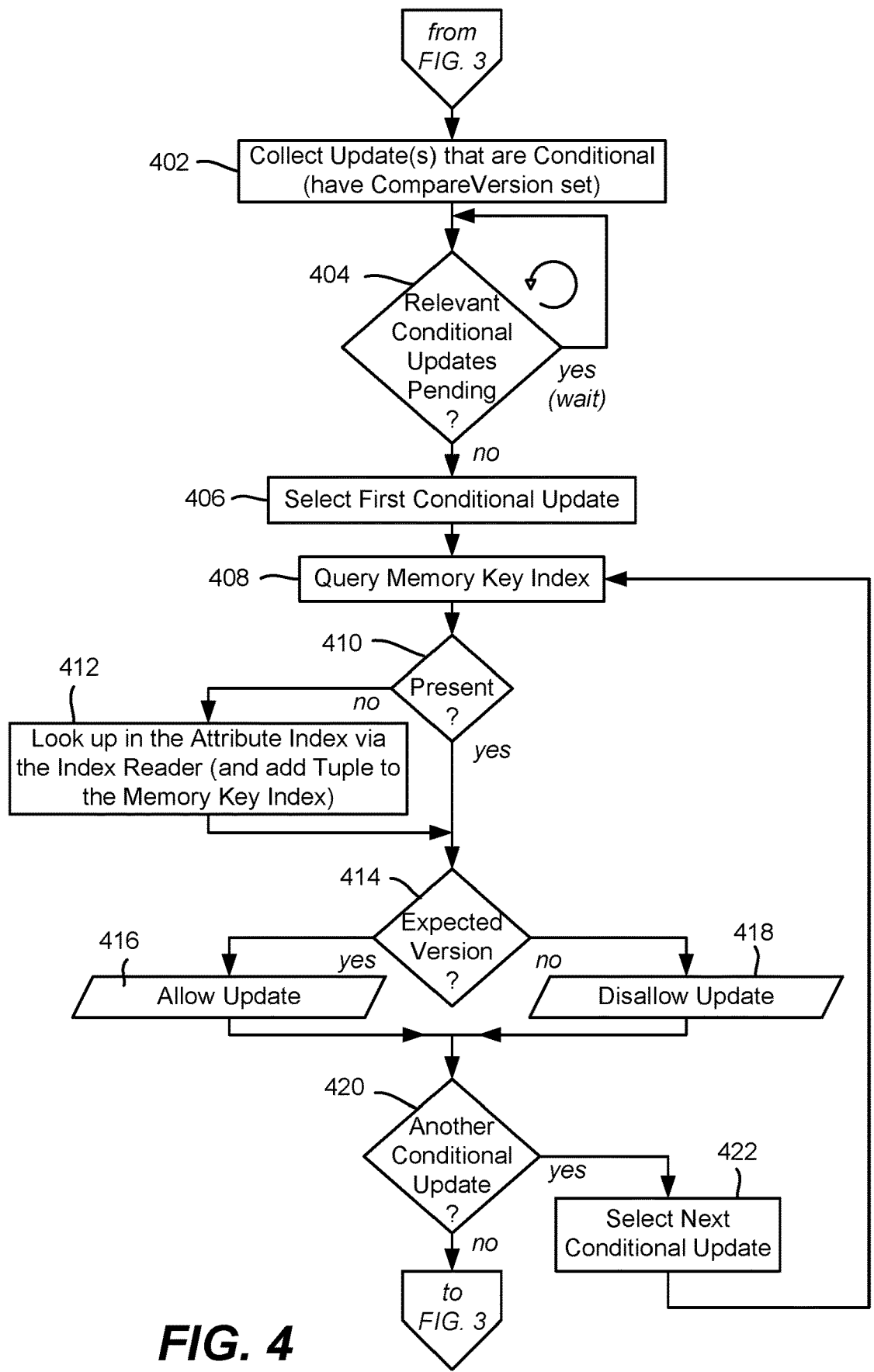

Turning to asynchronous indexing, in regular updating, the operations of FIGS. 3 and 4 can perform on-the-fly indexing using a non-volatile storage. Data in such storage can be subject to loss once the process terminates. At the same time, it is not desirable to do immediate (blocking) indexing of new data (e.g., via the operations of FIGS. 7 and 8), as that can be relatively inefficient and can thus increase the perceived latency of an update call. To avoid this, the memory key index can be used as described above, with indexing work done in the background.

Figure 12:
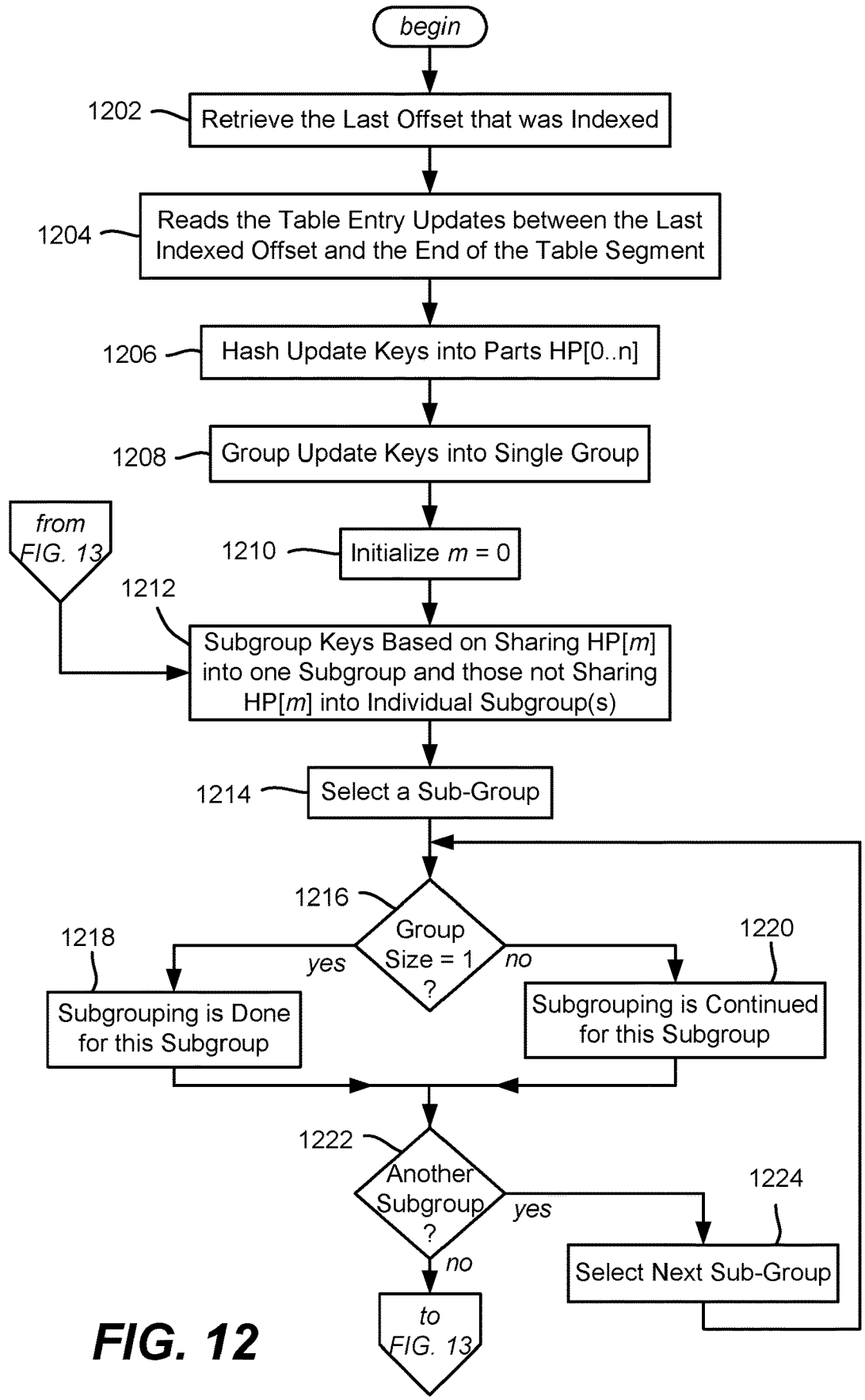
FIGS. 12 and 13 comprise a flow diagram representing the asynchronous indexing of attribute index updates, in accordance with various aspects and implementations of the subject disclosure.
Figure 13:
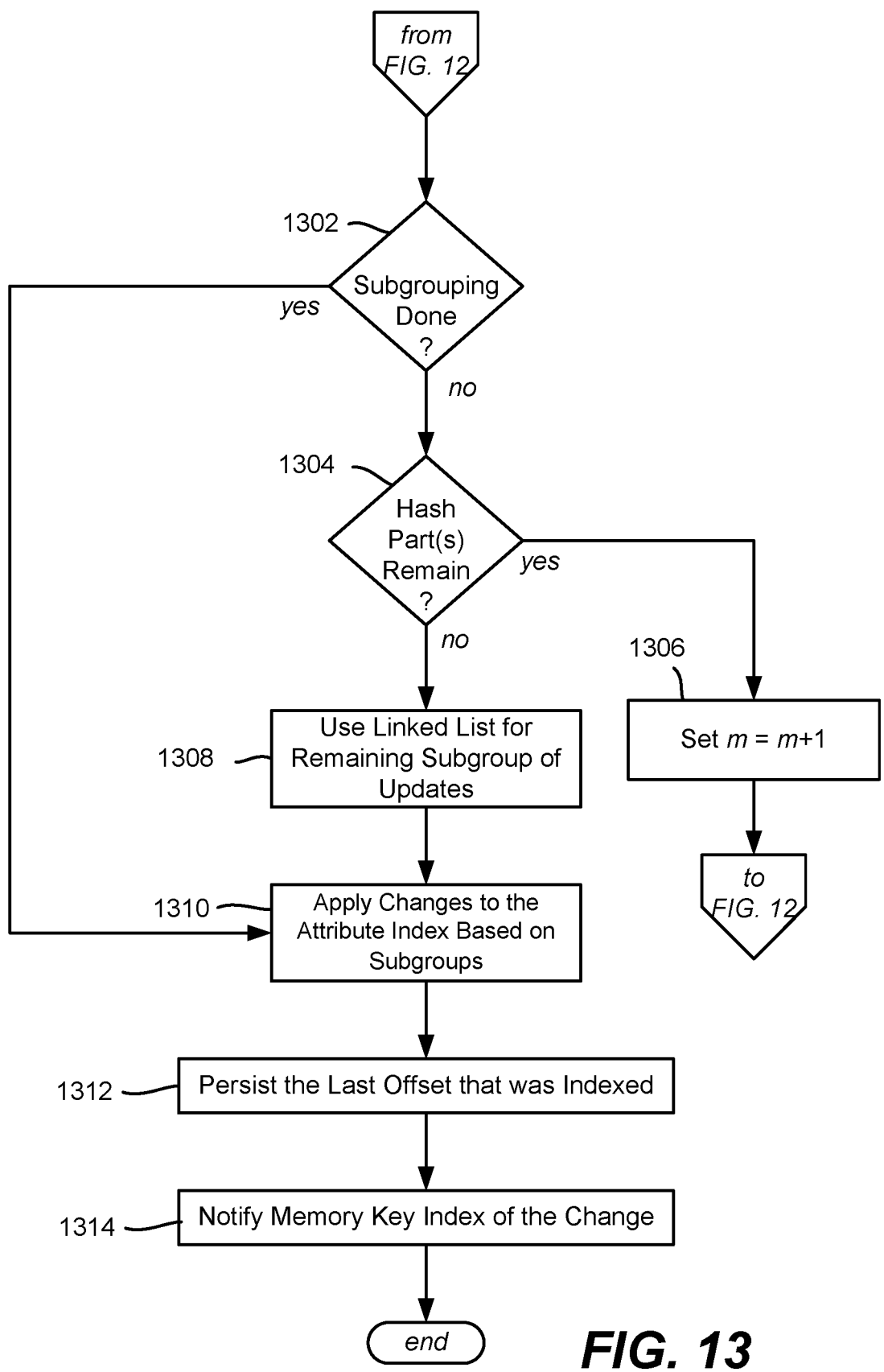

FIGS. 12 and 13 show an example as to how asynchronous indexing can be efficiently performed for storage of non-ordered information, particularly with respect to hash collisions of table keys that can possibly occur. Note that table entry updates already have been serialized and written to the table segment by the memory key index 234 (operation 306 of FIG. 3).

During asynchronous indexing, the index writer 232 (which can incorporate or be coupled to the asynchronous indexing component 236) can maintain and retrieve the last offset that was indexed (and can durably persist this upon every change, so that this value cannot be lost). The index writer 232 can read the table entry updates between that last indexed offset and the end of the table segment, and can index these entries.

As described above, any time the attribute index is accessed, the table keys can be hashed using the hash function/hash part splitting operations described above. Thus, operation 1206 results in H and HP[0 . . . n] for each update key. Operation 1208 groups these hash values together in a single group.

Thereafter, the group can be subsequently broken down into smaller and smaller groups based on collisions, as can be determined by the values of HP[0 . . . n] for each key. For example, starting with HP[m] (where m=0 via operation 1210) and thereby considering only HP[0], any keys sharing HP[0] can be grouped together at operation 1212. Other keys can be sub-grouped into individual groups, as they have unique hashes. Then, following the logic of FIGS. 12 and 13, thereby next considering HP[1], each existing group can be broken down into one or more sub-groups based on that next hash part value, and so on.

Thus, after a first hash part is considered, operations 1216 and 1218, along with operations 1222 and 1224, can remove subgroups from further subgrouping when a group size reaches one. Otherwise subgrouping can continue via operation 1220.

Operation 1302 of FIG. 13 evaluates whether subgrouping is done, that is, each subgroup has a single key therein. If not, and hash parts remain as evaluated by step 1304, the next hash part can be used (operation 1306) to further attempt to break the subgroups with multiple keys into smaller subgroups. If subgrouping is done, operation 1310 can use the keys in the subgroups to update the attribute index.

In the event that a subgroup with more than one key remains after all hash parts have been exhausted, the structure described with reference to FIG. 6 can be used (operation 1308) to use the backpointers that form a linked list.

It should be noted that the index structure can be maintained when a key is updated and when a key is removed. This can involve removing entries from the attribute index.

After the changes are applied to the attribute index at operation 1310, the last indexed offset for the segment can be updated via operation 1312. The memory key index 234 can be notified of the change, so that any reads that blocked at step can be unblocked.

Figure 14:
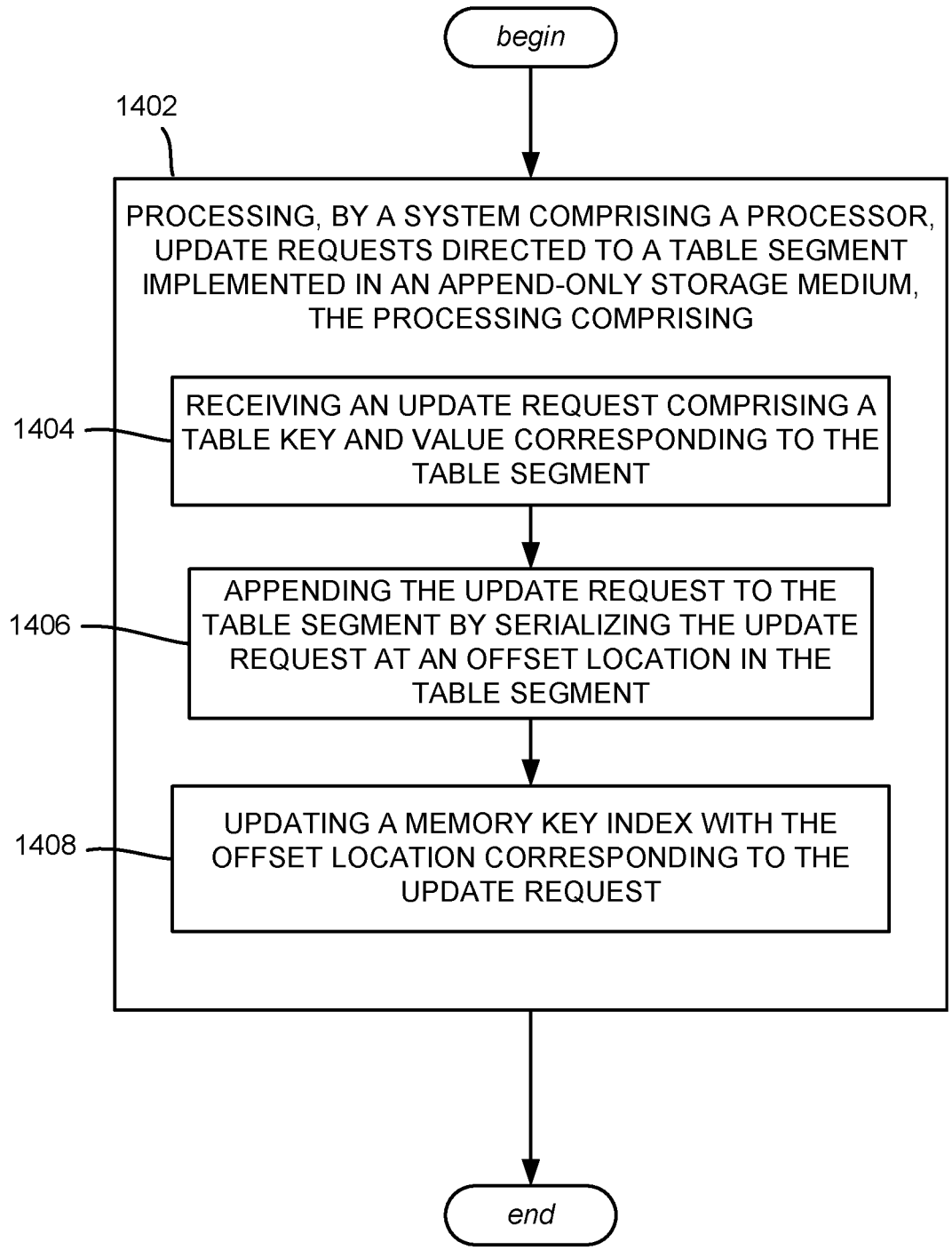
FIG. 14 is a flow diagram representing example operations related to processing an update request directed to a table segment, in accordance with various aspects and implementations of the subject disclosure.

One or more aspects, such as those implemented in example operations of a method as in FIG. 14, are directed towards (operation 1402) processing update requests directed to a table segment implemented in an append-only storage medium. The processing comprises receiving (operation 1404) an update request comprising a table key and value corresponding to the table segment, appending (operation 1406) the update request to the table segment by serializing the update request at an offset location in the table segment; and updating (operation 1408) a memory key index with the offset location corresponding to the update request.

The update request can comprise a compare version value, and aspects can comprise validating the compare version value with respect to an expected version value, and based on the validating, allowing the appending and the updating to proceed. Aspects can comprise waiting for another update request to complete. Aspects can comprise looking for the expected value in the memory key index, and in response to the expected value being determined not to be present in the memory key index, using the table key to access the attribute index to obtain an offset location in the table segment corresponding to the offset location from which the expected value is able to be obtained.

When the expected value is not found in the memory key index, aspects can comprise adding the expected value to the memory key index before the updating of the memory key index with the offset location of the table key. When the expected value is not found in the memory key index and the attribute index is configured as a tree structure, using the table key to access the attribute index can comprise hashing the table key into a hash value that corresponds to a node in the tree structure that comprises the offset location in the table segment from which the expected value is able to be obtained.

Aspects can comprise asynchronously indexing the memory key index to an attribute index stored in an extended append-only storage medium. Asynchronously indexing the memory key index to the attribute index can comprise hashing table keys in the memory key index into a series of hash parts corresponding to each table key, grouping data in the memory key index into subgroups based on the series of hash parts for each table key, and using the subgroups for indexing the memory key index to the attribute index.

Aspects can comprise receiving a read request comprising the table key, the read request requesting a requested value paired with the table key, and in response to the receiving the read request, looking for the requested value in the memory key index, and in response to the requested value being determined not to be present in the memory key index, using the table key to access the attribute index to obtain an offset location in the table segment corresponding to the offset location from which the requested value is able to be obtained. Using the table key to access the attribute index can comprise hashing the table key into a hash value that corresponds to a node in the tree structure that comprises the offset location in the table segment from which the requested value is able to be obtained.

Figure 15:
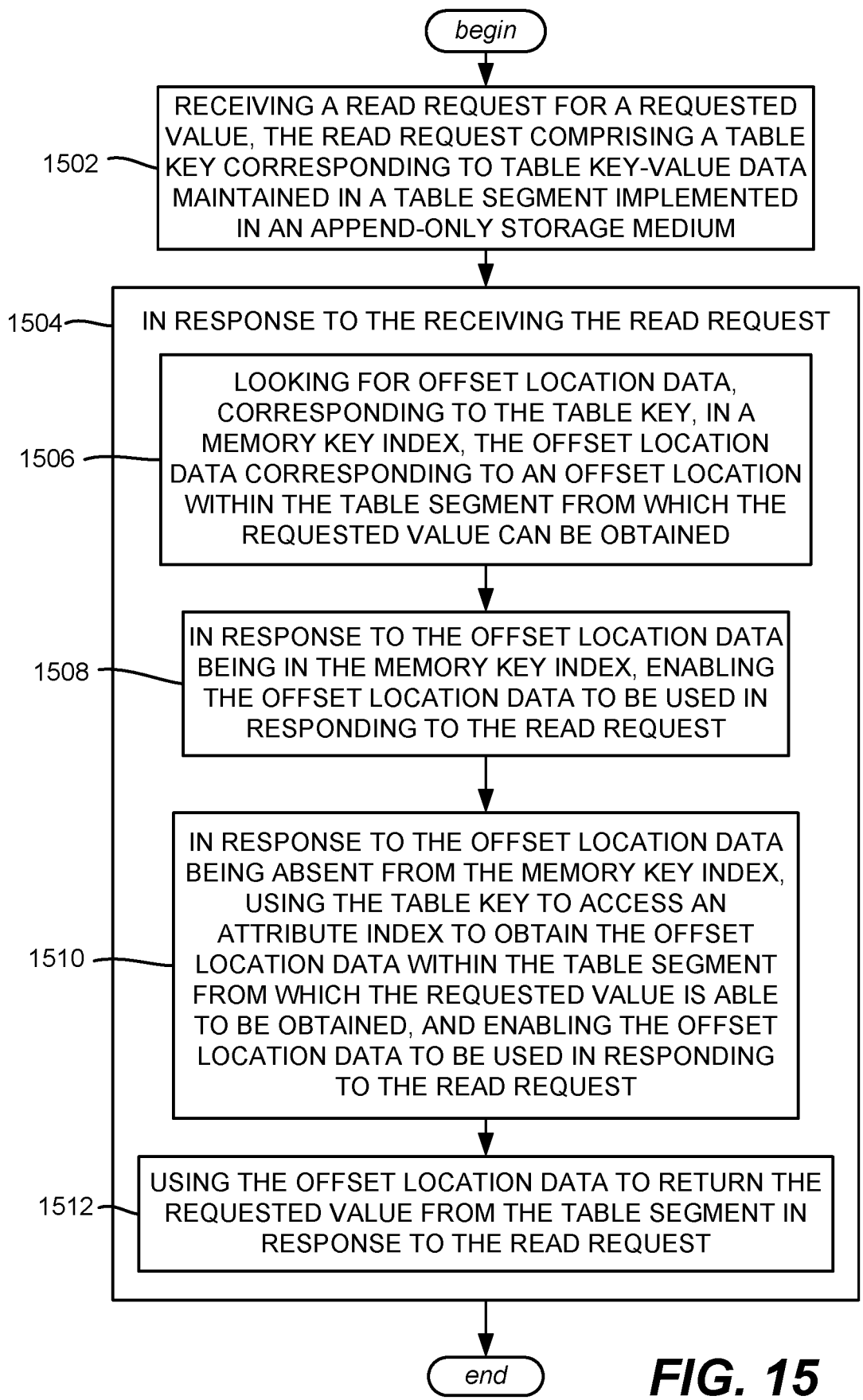
FIG. 15 is a flow diagram representing example operations related to processing a read request directed to a table segment, in accordance with various aspects and implementations of the subject disclosure.

One or more example aspects are represented in FIG. 15, wherein blocks in FIG. 15 can correspond to operations of a method, components of a system, or stored executable instructions that, when executed by a system comprising a processor and a memory, facilitate performance of operations. Example operations comprise operation 1502, which represents receiving a read request for a requested value, the read request comprising a table key corresponding to table key-value data maintained in a table segment implemented in an append-only storage medium. In response to the receiving the read request (operation 1504), operations 1506, 1508, 1510 and 1512 are performed. Operation 1506 represents looking for offset location data, corresponding to the table key, in a memory key index, the offset location data corresponding to an offset location within the table segment from which the requested value can be obtained. Operation 1508 represents, in response to the offset location data being in the memory key index, enabling the offset location data to be used in responding to the read request. Operation 1510 represents, in response to the offset location data being absent from the memory key index, using the table key to access an attribute index to obtain the offset location data within the table segment from which the requested value is able to be obtained, and enabling the offset location data to be used in responding to the read request. Operation 1512 represents using the offset location data to return the requested value from the table segment in response to the read request.

Using the offset location data to return the requested value from the table segment in response to the read request can comprise issuing a segment read request in conjunction with the offset location data.

When the requested value is absent from the memory key index, and the attribute index is configured as a tree structure, using the table key to access the attribute index can comprise hashing the table key into a hash value that corresponds to a node in the tree structure that comprises the offset location data from which the requested value is able to be obtained. Hashing the table key into the hash value can comprise using a hash function to obtain the hash value, and dividing the hash value into a series of hash value parts, comprising a primary hash value part that corresponds to a node in the tree structure, and, in response to a collision with another primary hash value part of another hash value of another table key, a secondary hash value part that corresponds to a child node of the node in the tree structure.

Further example operations can comprise receiving an update request corresponding to the table segment, the update request comprising the table key and an updated value, appending the update request to the table segment by serializing the update request at a new offset location in the table segment, and updating the memory key index with the new offset location corresponding to the update request.

Figure 16:
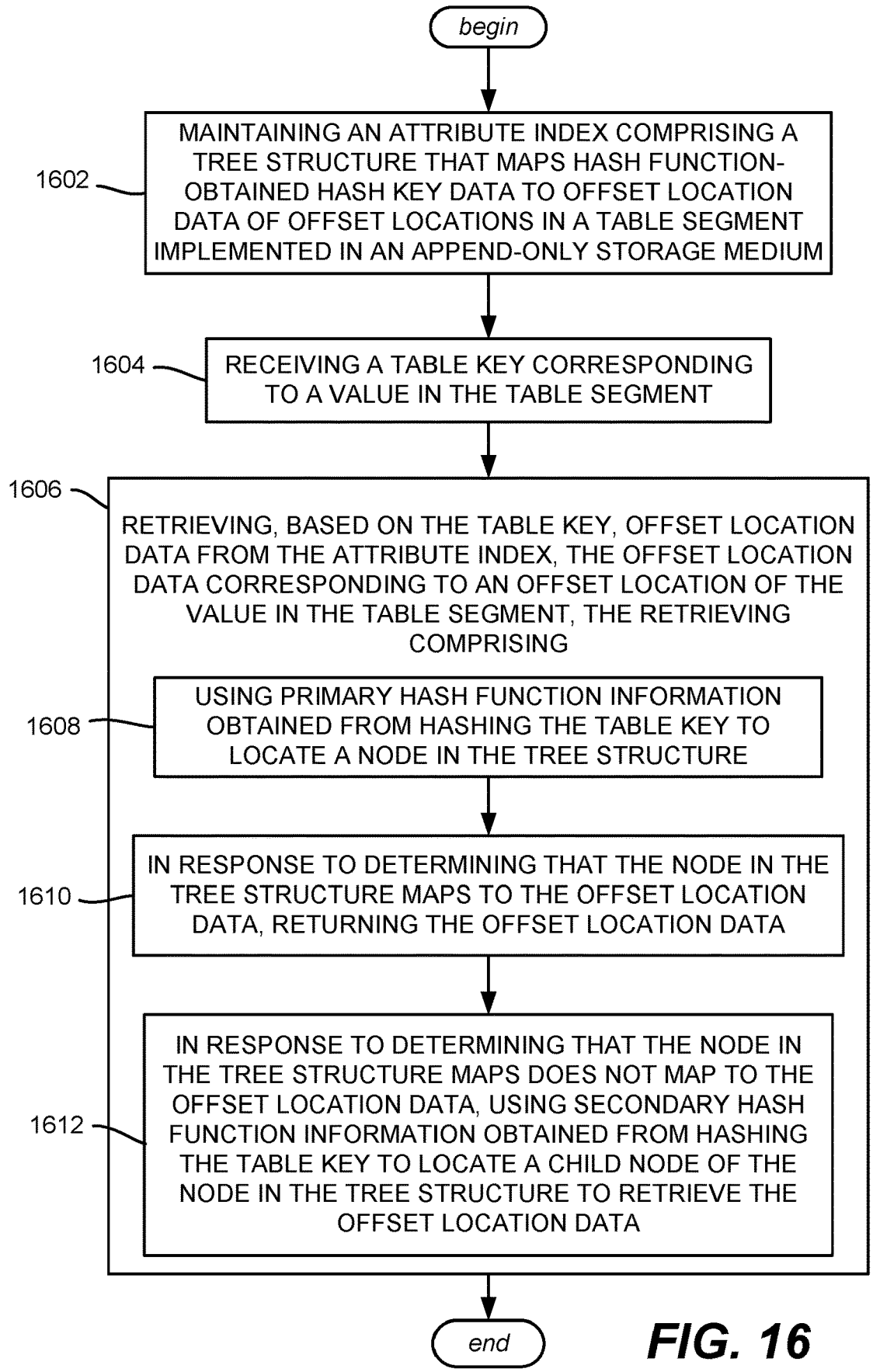
FIG. 16 is a flow diagram representing example operations related to accessing an attribute index corresponding to a table segment based on hash value information obtained from a table key directed to the table segment, in accordance with various aspects and implementations of the subject disclosure.

One or more aspects, such as can be implemented in a machine-readable storage medium, comprising executable instructions that, when executed by a processor, facilitate performance of operations, are represented in FIG. 16. Example operations can comprise operation 1602, which represents maintaining an attribute index comprising a tree structure that maps hash function-obtained hash key data to offset location data of offset locations in a table segment implemented in an append-only storage medium. Operation 1604 represents receiving a table key corresponding to a value in the table segment. Operation 1606 represents retrieving, based on the table key, offset location data from the attribute index, the offset location data corresponding to an offset location of the value in the table segment. The retrieving can comprise using primary hash function information obtained from hashing the table key to locate a node in the tree structure (operation 1608), and in response to determining that the node in the tree structure maps to the offset location data, returning the offset location data (operation 1610), and in response to determining that the node in the tree structure maps does not map to the offset location data, using secondary hash function information obtained from hashing the table key to locate a child node of the node in the tree structure to retrieve the offset location data (operation 1612).

Using the primary hash function information obtained from the hashing the table key can comprise hashing the table key into a hash value, and dividing the hash value into a series of hash parts comprising the primary hash function information and one or more secondary hash parts corresponding to the secondary hash function information.

Using secondary hash function information obtained from hashing the table key to locate the child node can comprise determining that the child node corresponds to a linked list data structure.

Maintaining the attribute index can comprise hashing table keys in a memory key index into respective hash values, dividing the hash values into respective series of hash parts, grouping the table keys into subgroups based upon the respective hash parts, and updating the attribute index based on the subgroups.

Further operations can comprise using the offset location data in handling read operations and update operations.

As can be seen, the technology described herein provides a key-value store to a table segment in which append-only storage is used. An attribute index can be accessed via a hash function divided into parts (or series of hash functions), to provide a hash array mapped tree, comprising a search tree where each non-leaf node is a list of hashes that point to other nodes. At each level, a new hash is calculated based on the key; the leaf levels contain the data.

FIGS. 17-19 and corresponding description herein are directed to additional aspects, which can extend the technologies described above with reference to FIGS. 1-16, to support storage of ordered associative arrays of pairs. FIGS. 1-16 disclose techniques applicable to storing non-ordered associative arrays of pairs using append-only storage media. Non-ordered associative arrays have a drawback in that they do not support order between pairs (keys), so operations such as range queries and listing keys in sorted order remain unsupported. FIGS. 17-19 therefore describe an end-to-end implementation of how to store an ordered associative array of pairs using an append-only storage medium.

In general, techniques according to FIGS. 17-19 can efficiently organize data in a single, non-distributed database as an associated array of key-value pairs implemented on top of a storage medium that can be limited to data appends—that is, data can be added after an end of previously added data, and once written, the data can be restricted from being overwritten. In an ordered implementation according to FIGS. 17-19, the keys can be sorted and can be returned in a specific order.

FIGS. 17-19 provide, inter alia, methods for adding order to an unordered collection of key-value pairs that are indexed by key without the need for additional external structures. The disclosed methods of sorting keys, while presented with a specific implementation for context, can be applied to any data structure that implement a hash table pattern. For example, the disclosed methods could be implemented, with a few adjustments, to sort the entries of a typical programming language hash map (e.g., Java HashMap or .NET Dictionary).

Problems overcome by solutions according to this disclosure include, e.g., severe copy-on-write/write amplification which can occur when attempting to use a B+Tree on an append-only media. The solution presented herein does not suffer from copy-on-write/write amplification as it is more compact. Furthermore, performance reduction can result from indexing on the front end. To avoid this issue, solutions presented herein employ a cache for front-end validation and index asynchronously in the background. Solutions presented herein also generally separate, on one hand, an optimized solution for hash-based indexing and lookup from, on the other hand, a dedicated solution for storing order among keys. This separation provides for improved performance of the overall system, which, given the constraints of having to use append-only media in the presence of unreliable hardware prone to frequent crashes, can perform better than other implementations that have similar goals.

Prior to discussion of FIGS. 17-19 in detail, an introduction of certain definitions and system components is appropriate. For the purpose of FIGS. 17-19, a "Table Segment" is defined as a non-distributed associative array of keys that point to values, with the property that each key appears only once. A "Table Entry" is defined as a tuple {Key, Value, Version} that exists in the Table Segment.

System components can include the following: A "Segment Store" can receive and process Table Segment requests. A "Segment File" can provide an append-only storage medium. An "Attribute Index" can comprise an associative array of keys and values, e.g., 16 byte keys and 8 byte values, which can be stored in an append-only storage medium. Each Table Segment can have an Attribute Index. A "Table Segment Index (TSI)" can comprise multiple parts, including (1) a persisted part (TSI.P), and (2) a tail part (TSI.T). A "Sorted Key Index (SKI)" can also comprise multiple parts, including (1) a persisted part (SKI.P), and (2) a tail part (SKI.T).

FIG. 17 illustrates an example system and method to perform updates and indexing of an ordered associative array of pairs, in accordance with various aspects and implementations of the subject disclosure. FIG. 17 comprises an update request 1701, an external key translator 1702, an update processor 1703, a conditional update validator 1704, a segment file 1705, a table segment index (TSI) 1706 comprising a tail portion 1707 and a persisted portion 1708, an index writer 1709, an append only media 1710, an attribute index 1711, a sorted key index 1712 comprising a tail portion 1713 and a persisted portion 1714, and an internal key translator 1715.

In FIG. 17, the illustrated interactions between components can be separated into two groups. A first group corresponds to update operations, and comprises interactions 1751, 1752, 1753, 1754, 1755(1), and 1755(2). A second group corresponds to asynchronous indexing operations, and comprises interactions 1761, 1762(1), 1762(2), 1763(0), 1763(1), and 1763(2).

In general, update operations for an update performed according to FIG. 17 can include receiving 1751 the update request 1701. The update request 1701 can comprise an external update, and the external key translator 1702 can translate the external update accordingly, e.g., by inserting "External" labels. The translated update request 1701 can then be sent 1752 for processing at the update processor 1703.

If the update request 1701 is conditional, the update request 1701 can optionally be validated 1753 against existing data at the conditional update validator 1704. Next, the update request 1701 can be serialized 1754 to the segment file 1705, and tail portions 1707 and 1713 of the in-memory indices 1706 and 1712 can be updated 1755(1), 1755(2).

In another example embodiment which can be understood with reference to FIG. 17, the update request 1701 can comprise a set of updates SU, each in the form {Key, Value, CompareVersion}. The set of updates can be received for a table segment S.

If SU is conditional, i.e., if at least one update in the SU has "CompareVersion" set, then the following operations can be performed at conditional update validator 1704. First, a collection can be performed to collect every update U in SU that has CompareVersion set. The resulting collection can be referred to as CU. Next, if there are other pending conditional updates to any table key in CU, then this operation can wait for their completion. Finally, every update U in CU can be validated: first the TSI.T 1707 can be queried, and if not present, the value can be looked up in the TSI.P 1708 via an index reader, and it can be added to the TSI.T 1707. After that, we either allow or disallow the update to proceed based on the value that is found.

When the update proceeds, SU can be serialized 1754 and appended to the segment file 1705. The TSI.T 1707 can be updated with the key versions (offsets) of each key K in SU. The SKI.T 1708 can be updated with the keys in SU.

FIG. 17 also illustrates interactions 1761, 1762(1), 1762(2), 1763(0), 1763(1), and 1763(2), directed to asynchronous indexing. With regard to asynchronous indexing in general, the above described update operations perform on-the-fly indexing, however, since indexing data is stored in memory, it can be subject to loss once the process terminates. At the same time, it is not desirable to do immediate indexing of new data, because that can result in delays and can thus increase perceived latency of calls. As such, in some embodiments, indexing work can be done asynchronously in the background.

In an embodiment, asynchronous indexing can include reading 1761 change(s) from the segment file 1705 and indexing the changes by the index writer 1709. Persisted indices can be updated by updating the persisted portion 1708, via interaction 1762(1), and updating the persisted portion 1714, via interaction 1762(2). The persisted portion 1708 can store data in the attribute index 1711, as shown.

The sorted key index 1712 can retrieve and update its BTreeSet nodes and store them as table entries in the table segment. These table entries can be provided 1763(0) to the internal key translator 1715, and the internal key translator 1715 can label the table entries, e.g., as "Internal". The BTreeSet Nodes can be retrieved via interaction 1763(1), and the BTreeSet Nodes can be updated via interaction 1763(2).

Asynchronous indexing can achieve the following goal: transfer TSI.T 1707 to TSI.P 1708 and transfer SKI.T 1713 to SKI.P 1714. Note that, as part of the update operations described with regard to FIG. 17, table entry updates can be serialized and written to the segment file 1705 and the TSI.T 1707 can be updated.

The index writer 1709 can be configured to record the last offset that it has indexed, e.g., by durably persisting the last offset upon every change, so that its value is not lost. The index writer 1709 can read all the table entry updates between the last indexed offset and the end of the table segment, and the index writer 1709 can index them in the following way. Updates can be read from the segment file 1705 in batches. Each batch can be parsed and updates can be deserialized in the form {Key, Value, Version}. Each key in the batch can be processed according to an index update procedure. When a batch is fully processed, the results can be durably persisted in the attribute index 1711. The index structure can be maintained both if a key is updated and when a key is removed. This may involve removing entries from the attribute index 1711. Finally, the last indexed offset can be updated to point to the end of the processed batch.

The TSI.T 1707 can be notified 1762(1) of changes, so that any previously blocked reads can be unblocked. The TSI.T 1707 can be free to release any memory associated with keys that have just been indexed, since they can now be retrieved from the TSI.P 1708. The SKI.T 1713 can also be notified 1762(2) of changes, so that it can also release any memory associated with keys that have just been indexed.

In another example embodiment which can be understood with reference to FIG. 17, the update request 1701 can comprise a group of updates directed to a table segment implemented in an append-only storage medium, such as append-only media 1710. Processing the update request 1701 can comprise receiving 1751 the group of updates in 1701, wherein an update in the group of updates 1701 comprises, e.g., a key and a value. The group of updates can be serialized, e.g., by the update processor 1703, and the group of updates can be appended to the table segment, that is, to the segment file 1705 in the append-only media 1710. The tail portion 1707 of the table segment index 1706 can be updated to include an offset corresponding to the key. The tail portion 1713 of the sorted key index 1712 can also be updated to include the key.

In an aspect, the update in the group of updates can comprise a property to indicate whether the update is a conditional update. In response to the property indicating that the update in the group of updates is a conditional update, embodiments can collect all conditional updates in the group of updates, embodiments can wait for completion of another update if needed, and embodiments can validate the update and determine whether to allow the update based on a result of the validating.

Validating the update can comprise querying the tail portion 1707 of the table segment index 1706 to determine whether the tail portion 1707 of the table segment index 1706 comprises an expected value. Validating the update can further comprise, in response to the tail portion 1707 of the table segment index 1706 not comprising the expected value, querying a persisted portion 1708 of the table segment index 1706 to determine whether the persisted portion 1708 of the table segment index 1706 comprises the expected value.

FIG. 18 illustrates an example system and method to perform read operations, in accordance with various aspects and implementations of the subject disclosure. FIG. 18 comprises various elements introduced in FIG. 17, and like elements are identified using like identifiers. FIG. 18 comprises a read keys request 1801, an external key translator 1702, a table segment index (TSI) 1706 comprising a tail portion 1707 and a persisted portion 1708, an attribute index 1711, a segment file 1705, and append only media 1710. The illustrated interactions between components comprise interactions 1851, 1852, 1853, 1854(1), and 1854(2).

In general, read operations according to FIG. 18 can include receiving 1851 the read keys request 1801. The external key translator 1702 can label keys in a key range specified in read keys request 1801, e.g., by inserting "External" labels, thereby generating a labeled key list. The labeled key list can be provided 1852 to the TSI 1706. At interaction 1853, the TSI 1706 can be configured to use the attribute index 1711, the segment file 1705, and the append only media 1710 to fetch the values associated with the requested keys in the key list. At interactions 1854(1) and 1854(2), the fetched values can be returned to the caller, namely, the device or process from which the read keys request 1801 was received, while ensuring the returned keys are "untranslated" by removing labels initially applied at the external key translator 1702.

In another embodiment, read operations can include receiving 1851 a set of keys SU, included in read keys request 1801, wherein the set of keys SU is for a table segment S stored in a segment file 1705. Each key K in the set of keys SU can be looked up in TSI.T 1707. If a key K is present, its latest offset can be fetched from TSI.T 1707. Otherwise, the latest offset for the key K can be looked up in the TSI.P 1708, which is described further below in connection with index retrievals. If the attribute index 1711 is behind in terms of indexing (due to asynchronous indexing as discussed in connection with FIG. 17), the read operation can be blocked until the index writer 1709 notifies that data has been properly indexed. For each key K in the set of keys SU that has an offset retrieved, a segment read is issued for table segment S, at its corresponding offset, to retrieve its value. A list of values can be compiled and returned.

FIG. 19 illustrates an example system and method to list keys in order, in accordance with various aspects and implementations of the subject disclosure. FIG. 19 comprises various elements introduced in FIG. 17, and like elements are identified using like identifiers. FIG. 19 comprises a list keys/entries request 1901, an external key translator 1702, a list processor 1903, a table segment index (TSI) 1706 comprising a tail portion 1707 and a persisted portion 1708, a sorted key index (SKI) 1712 comprising a tail portion 1713 and a persisted portion 1714, an internal key translator 1715, an attribute index 1711, a segment file 1705, and an append only media 1710. The illustrated interactions between components comprise interactions 1951, 1952, 1953(1), 1953(2), 1953(2)(a), 1953(2)(b), 1954, 1955, 1956(1) and 1956(2).

In general, list key operations according to FIG. 19 can include receiving 1951 a list keys/entries request 1901. The external key translator 1702 can label a key range specified in list keys/entries request 1901, e.g., by inserting "External" labels. The translated key range can be provided 1952 to the list processor 1903. The list processor 1903 can query the sorted key index (SKI) 1712 via interactions 1953(1) and 1953(2), thereby querying the tail portion 1713 and the persisted portion 1714. To satisfy the query 1953(2), the persisted portion 1714 can request 1953(2)(a) BTreeSet nodes. Such requests 1953(2)(a) can labeled as "internal" by the internal key translator 1715, and can be sent 1953(2)(b) to the TSI 1706 for retrieval. The TSI 1706 can retrieve such data from its tail portion 1707 or its persisted portion 1708.

At interaction 1954, the list processor 1903 can merge the results returned from tail portion 1713 and persisted portion 1714. Optionally, if a list entry was requested, the list processor 1903 can request 1955 values associated with the returned keys, using techniques described in connection with FIG. 18. The result can be returned to the caller from which the list keys/entries request 1901 was received via interactions 1956(1) and 1956(2), while ensuring the returned keys are "untranslated" by removing previously applied labels. The caller can submit 1951 further requests 1901 as needed, e.g., when a returned key range does not cover the entire requested range.

In another embodiment, operations performed in connection with listing keys in order can include receiving 1951 the list keys/entries request 1901. The list keys/entries request 1901 can comprise, e.g., a request for listing all table keys between values K1 and K2, for a table segment S. K1 and K2 can comprise the lower and upper bounds, respectively. They may be inclusive or exclusive of those values, and they may also optionally indicate no low or upper bound. In response to receiving the list keys/entries request 1901, the tail portion 1713 can be queried 1953(1) for a sorted list of keys that satisfy the range K1 . . . K2. This query result can be named, e.g., TailResult. The persisted portion 1714 can also be queried 1953(2) for a sorted list of keys that satisfies the range K1 . . . K2. This query result can be named, e.g., PersistedResult.

Next, the query results (TailResult and PersistedResult) can be merged into a final result named, e.g., FinalResult. The merging operation can utilize, e.g., the following merge rules: First, if a key K exists in both PersistedResult and TailResult, and TailResult indicates the Key has been removed, do not include K in FinalResult. Second, otherwise, if key K exists in either PersistedResult or FinalResult, include K in FinalResult. Finally, it may be the case that FinalResult may end up being very large, so its size can be unfeasible to return it at once. As such, FinalResult can be capped to a maximum size.

Merged query results (FinalResult) can be returned to the caller. Both TailResult and PersistedResult are sorted, and FinalResult can be constructed from these as a sorted list as well. If FinalResult did not cover all the range requested by the caller, the caller can be given the option to send a subsequent request using the last key contained in FinalResult as K1 (i.e., List(Last_Key_of_FinalResult, K2)). By concatenating the two results, the caller can get the full list of keys, in order.

In a further embodiment which can be understood with reference to FIG. 19, example operations can include, e.g., receiving a request 1901 for a list of keys in a table segment, wherein the table segment comprises a non-distributed associative array of keys that point to values. In an aspect, the request for the list of keys in the table segment 1901 can comprise a lower bound value and an upper bound value. The request for the list of keys in the table segment 1901 can be inclusive of the lower bound value and the upper bound value, or exclusive of the lower bound value and the upper bound value, or the request for the list of keys in the table segment can comprise either a lower bound value or an upper bound value (i.e. just one bound value).

A tail portion 1713 of a sorted key index 1712 can be queried for a first list of keys that satisfy the request 1901, wherein the tail portion 1713 of the sorted key index 1712 is stored in a first memory, such as in volatile memory. A persisted portion 1714 of the sorted key index 1712 can also be queried for a second list of keys that satisfy the request 1901, wherein the persisted portion 1714 of the sorted key index 1712 is stored in a second memory, such as on disk.

The first list of keys and the second list of keys can be merged into a merged list of keys, and the merged list of keys can be returned 1956(2) in response to the request 1901. Merging the first list of keys and the second list of keys into the merged list of keys can comprise including a key in the merged list of keys in response to the key being determined to exist in the first list of keys or in the second list of keys. A key can be omitted from the merged list of keys in response to the key being determined to be flagged as deleted from the first list of keys. Embodiments can furthermore prevent the merged list of keys from exceeding a size limit.

With regard to index structures for use with embodiments according to FIGS. 17-19, in some embodiments, the index stored in the attribute index 1711 can comprise an associative array of keys and values, e.g., 16 byte keys and corresponding 8 byte values. The attribute index 1711 can be append-only, and can optionally comprise an append-only B+Tree, in some embodiments. The index can provide a mapping between a table key to an offset in the segment file 1705 where the table key exists. A table key can be, e.g., an arbitrary length byte sequence, while the offset can comprise, e.g., a fixed-size, 8-byte number. The table key and offset can both fit in attribute index 1711. A hashing function can optionally be used which takes a table key as input, and produces a 16-byte hash H (i.e., using the SHA256 algorithm).

In order to perform index updates, some embodiments can be understood by supposing existence of a table key K which exists at offset OF, and a goal to update the index to reflect that. In a first step, embodiments can generate the 16-byte hash H, mentioned above. If a first portion of the hash, e.g., a first 8 bytes, match a predefined, reserved constant (i.e., 0), then embodiments can select a new set of first 8 bytes (for example the constant value 1). This reserved value can be used in the next step.

In a next step, if there exists another key K2 which shares H with K, then we have a collision. Embodiments, can concatenate an 8-byte representation of 0 (the reserved value referenced in the first step) with OF and remember it as, e.g., BackpointerSource. Embodiments can find the offset of key K2 which collides with our Key K. Call this, e.g., BackpointerTarget. Embodiments can then insert {BackpointerSource, BackpointerTarget} (16 bytes, 8 bytes) into the attribute index 1711.

With regard to index retrieval operations for use with embodiments according to FIGS. 17-19, some embodiments can be understood by supposing we have a table key K that we want to look up in the index. In a first operation, a hash, e.g., a 16-byte hash H, can be generated as described herein. If a first portion of the hash, e.g., the first 8 bytes, match a predefined, reserved constant (i.e., 0), then we can select a new set of first 8 bytes (for example the constant value 1).

In a second operation, embodiments can perform a lookup in the attribute index 1711 for the value associated with H. this value can be named, e.g., AV1. If AV1 does not exist, embodiments can stop here.

In a second operation, embodiments can perform a segment file 1705 read at offset AV1, to read the table key at that location (the table key at that location can be referred to as RK). If RK matches K, then the result is found, and the value associated with this key can be returned. Otherwise, embodiments can continue to the fourth operation.

In a fourth operation, embodiments can concatenate an 8-byte representation of 0 AV1 into a value named, e.g., BackpointerSource. Embodiments can perform a lookup in the attribute index 1711 for BackpointerSource (name it, e.g., BackpointerTarget). If BackpointerTarget does not exist, embodiments can stop here. Also, embodiments can go back to the third operation, ensuring BackpointerTarget is passed to the attribute index 1711 instead of AV1.

In an example implementation, the sorted key index (SKI) 1712 can comprise a tail portion 1713 and a persisted portion, as illustrated in FIGS. 17-19. The tail portion 1713 can comprise a memory data structure and can be implemented wholly as a sorted array, with each element being a key. When inserting a key K, embodiments can ensure that any key K1<K appears before K in the tail portion 1713, and any key K2>K appears after K in the tail portion 1713. If K already exists, it need not be inserted. Embodiments can update tail portion 1713 on every key insertion, update or deletion. Each key K can have a flag associated with it, indicating whether it has been recently deleted or not. Processing range requests (e.g., requests for all keys in range K1 . . . K2) can involve a lookup for K1 in the tail portion 1713 and then listing all items up to K2.

The persisted portion 1714 can comprise a disk-memory data structure that stores its elements in sorted order. Persisted portion 1714 can be durably stored in some medium so that it may be recovered in case of a failure. In an example implementation, a B+Tree Set (BTS) can be used for persisted portion 1714. A BTS is similar to a classic B+Tree, but it does not include values associated with keys. The persisted portion 1714 can be maintained using, e.g., only the segment file 1705 and the persisted portion 1808. In other words, the persisted portion 1714 can be maintained using other constructs described herein.

An example BTS is made of nodes. Leaf nodes contain keys in sorted order, while index nodes have pointers from keys to other nodes. BTS nodes can be stored alongside other table keys in the table segment. When the BTS needs the contents of a node, it can make a request to the table segment. When the BTS needs to update one or more nodes, it can make another request to the table segment. This poses the risk of key collision. The keys used by the BTS may have the same names as externally-provided keys, which is undesirable. To resolve this, the following safeguards can be implemented: First, BTS keys can be prefixed with a predefined constant (i.e., "Internal"). For example, an arbitrary BTS Node "1234" can be prefixed to have a key of "Internal1234". Second External keys can be prefixed with a different, predefined constant (i.e., "External"). For example, key "MyKey" can be internally translated to "ExternalMyKey". Third, when necessary, operations can be skipped for BTS nodes (internal). Fourth, all keys coming in, such as via update operations according to FIG. 17, can be translated or labeled as "External" keys. Fifth, all keys going out, e.g., as read results described in FIG. 18, can be reverse-translated, also referred to herein as untranslated, such as by converting "ExternalMyKey" back to "MyKey".

Updates and queries to the BTS can be done according to the rules of any B+Tree, including node splits and mergers. Range requests (e.g., a request for all keys in range K1 . . . K2) can translate to direct BTS queries that lookup key K1 and then list all keys until K2. Since a BTS stores items in sorted order, range queries are straightforward to execute.

Operations that can be performed in connection with the sorted key index (SKI) 1712 can comprise, e.g., maintaining a tail portion 1713 of a sorted key index 1712 in a volatile memory, wherein the tail portion 1713 of the sorted key index 1712 comprises first keys organized in a sorted array. Inserting a key K in the tail portion 1713 of the sorted key index 1712 can comprise determining a sort location for the key K, and inserting the key K at the sort location. Determining the sort location for the key K can comprises determining a location at which any key K1<K is before K in the tail portion of the sorted key index and any key K2>K is after K in the tail portion of the sorted key index.

Example operations can further comprise updating the tail portion 1713 of the sorted key index 1712 to reflect a key update or a key deletion. The tail portion 1713 of the sorted key index 1712 can comprise flags associated with the first keys (the keys in the tail portion 1713), and the flags can indicate whether a key has been deleted.

Furthermore, operations that can be performed in connection with the sorted key index (SKI) 1712 can comprise, e.g., maintaining a persisted portion 1714 of the sorted key index 1712 in a non-volatile memory, wherein the persisted portion 1714 of the sorted key index 1712 comprises a tree data structure comprising leaf nodes, the leaf nodes comprising second keys organized in a sorted order. The tree data structure can comprises a B+Tree Set, as described herein.

In response to a range request for keys in a range [K1 . . . K2], operations can include generating a list comprising keys between K1 and K2 in one or more of the tail portion of the sorted key index or the persisted portion of the sorted key index, as described herein.

FIG. 20 is a schematic block diagram of a computing environment 2000 with which the disclosed subject matter can interact. The system 2000 comprises one or more remote component(s) 2010. The remote component(s) 2010 can be hardware and/or software (e.g., threads, processes, computing devices). In some embodiments, remote component(s) 2010 can be a distributed computer system, connected to a local automatic scaling component and/or programs that use the resources of a distributed computer system, via communication framework 2040. Communication framework 2040 can comprise wired network devices, wireless network devices, mobile devices, wearable devices, radio access network devices, gateway devices, femtocell devices, servers, etc.

The system 2000 also comprises one or more local component(s) 2020. The local component(s) 2020 can be hardware and/or software (e.g., threads, processes, computing devices). In some embodiments, local component(s) 2020 can comprise an automatic scaling component and/or programs that communicate/use the remote resources 2010 and 2020, etc., connected to a remotely located distributed computing system via communication framework 2040.

One possible communication between a remote component(s) 2010 and a local component(s) 2020 can be in the form of a data packet adapted to be transmitted between two or more computer processes. Another possible communication between a remote component(s) 2010 and a local component(s) 2020 can be in the form of circuit-switched data adapted to be transmitted between two or more computer processes in radio time slots. The system 2000 comprises a communication framework 2040 that can be employed to facilitate communications between the remote component(s) 2010 and the local component(s) 2020, and can comprise an air interface, e.g., Uu interface of a UMTS network, via a long-term evolution (LTE) network, etc. Remote component(s) 2010 can be operably connected to one or more remote data store(s) 2050, such as a hard drive, solid state drive, SIM card, device memory, etc., that can be employed to store information on the remote component(s) 2010 side of communication framework 2040. Similarly, local component(s) 2020 can be operably connected to one or more local data store(s) 2030, that can be employed to store information on the local component(s) 2020 side of communication framework 2040.

In order to provide a context for the various aspects of the disclosed subject matter, FIG. 21, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 2120 (see below), nonvolatile memory 2122 (see below), disk storage 2124 (see below), and memory storage 2146 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 21 illustrates a block diagram of a computing system 2100 operable to execute the disclosed systems and methods in accordance with one or more embodiments/implementations described herein. Computer 2112, can comprise a processing unit 2114, a system memory 2116, and a system bus 2118. System bus 2118 couples system components comprising, but not limited to, system memory 2116 to processing unit 2114. Processing unit 2114 can be any of various available processors. Dual microprocessors and other multiprocessor architectures also can be employed as processing unit 2114.

System bus 2118 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1594), and small computer systems interface.

System memory 2116 can comprise volatile memory 2120 and nonvolatile memory 2122. A basic input/output system, containing routines to transfer information between elements within computer 2112, such as during start-up, can be stored in nonvolatile memory 2122. By way of illustration, and not limitation, nonvolatile memory 2122 can comprise read only memory, programmable read only memory, electrically programmable read only memory, electrically erasable read only memory, or flash memory. Volatile memory 2120 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 2112 can also comprise removable/non-removable, volatile/non-volatile computer storage media. FIG. 21 illustrates, for example, disk storage 2124. Disk storage 2124 comprises, but is not limited to, devices like a magnetic disk drive, floppy disk drive, tape drive, flash memory card, or memory stick. In addition, disk storage 2124 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 2124 to system bus 2118, a removable or non-removable interface is typically used, such as interface 2126.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a mapped cluster schema, altering the mapped cluster schema until a rule is satisfied, allocating storage space according to the mapped cluster schema, and enabling a data operation corresponding to the allocated storage space, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 21 describes software that acts as an intermediary between users and computer resources described in suitable operating environment 2100. Such software comprises an operating system 2128. Operating system 2128, which can be stored on disk storage 2124, acts to control and allocate resources of computer system 2112. System applications 2130 take advantage of the management of resources by operating system 2128 through program modules 2132 and program data 2134 stored either in system memory 2116 or on disk storage 2124. It is to be noted that the disclosed subject matter can be implemented with various operating systems or combinations of operating systems.

A user can enter commands or information into computer 2112 through input device(s) 2136. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 2112. Input devices 2136 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 2114 through system bus 2118 by way of interface port(s) 2138. Interface port(s) 2138 comprise, for example, a serial port, a parallel port, a game port, a universal serial bus, an infrared port, a Bluetooth port, an IP port, or a logical port associated with a wireless service, etc. Output device(s) 2140 use some of the same type of ports as input device(s) 2136.

Thus, for example, a universal serial busport can be used to provide input to computer 2112 and to output information from computer 2112 to an output device 2140. Output adapter 2142 is provided to illustrate that there are some output devices 2140 like monitors, speakers, and printers, among other output devices 2140, which use special adapters. Output adapters 2142 comprise, by way of illustration and not limitation, video and sound cards that provide means of connection between output device 2140 and system bus 2118. It should be noted that other devices and/or systems of devices provide both input and output capabilities such as remote computer(s) 2144.

Computer 2112 can operate in a networked environment using logical connections to one or more remote computers, such as remote computer(s) 2144. Remote computer(s) 2144 can be a personal computer, a server, a router, a network PC, cloud storage, a cloud service, code executing in a cloud computing environment, a workstation, a microprocessor-based appliance, a peer device, or other common network node and the like, and typically comprises many or all of the elements described relative to computer 2112. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 2146 is illustrated with remote computer(s) 2144. Remote computer(s) 2144 is logically connected to computer 2112 through a network interface 2148 and then physically connected by way of communication connection 2150. Network interface 2148 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 2150 refer(s) to hardware/software employed to connect network interface 2148 to bus 2118. While communication connection 2150 is shown for illustrative clarity inside computer 2112, it can also be external to computer 2112. The hardware/software for connection to network interface 2148 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
to organize data for storage via an append-only storage medium, processing, by a system comprising a hardware processor, a group of updates directed to a table segment implemented in the append-only storage medium, the processing comprising:
receiving the group of updates,
wherein an update in the group of updates comprises a key and a value, and
wherein the update in the group of updates comprises a property to indicate whether the update is a conditional update;
in response to the property indicating that the update in the group of updates is a conditional update, validating the update and determining whether to allow the update based on a result of the validating, wherein validating the update comprises querying the tail portion of the table segment index to determine whether the tail portion of the table segment index comprises an expected value;
serializing the group of updates;
appending the group of updates to the table segment;
updating a tail portion of a table segment index to include an offset corresponding to the key; and
updating a tail portion of a sorted key index to include the key.

2. The method of claim 1, wherein updating the tail portion of the sorted key index comprises updating a volatile memory comprising the tail portion of the sorted key index.

3. The method of claim 1, further comprising, in response to the property indicating that the update in the group of updates is the conditional update, collecting all conditional updates in the group of updates.

4. The method of claim 1, further comprising, in response to the property indicating that the update in the group of updates is the conditional update, waiting for completion of another update.

5. The method of claim 2, further comprising maintaining a persisted portion of the sorted key index in a non-volatile memory, wherein the persisted portion of the sorted key index comprises a tree data structure comprising leaf nodes, the leaf nodes comprising keys organized in a sorted order.

6. The method of claim 1, wherein the tail portion of the sorted key index comprises keys organized in a sorted array.

7. The method of claim 1, wherein validating the update further comprises, in response to the tail portion of the table segment index not comprising the expected value, querying a persisted portion of the table segment index to determine whether the persisted portion of the table segment index comprises the expected value.

8. A system, comprising:
a hardware processor; and
a memory that stores executable instructions that, when executed by the processor, facilitate performance of operations that organize data for storage via an append-only storage medium, the operations comprising:
processing a group of updates directed to a table segment, the processing comprising:
receiving the group of updates,
wherein an update in the group of updates comprises a key and a value, and wherein the update in the group of updates comprises a property to indicate whether the update is a conditional update;

validating the update and determining whether to allow the update based on a result of the validating, wherein validating the update comprises querying the tail portion of the table segment index to determine whether the tail portion of the table segment index comprises an expected value;

serializing the group of updates;

appending the group of updates to the table segment;

updating a tail portion of a table segment index to include an offset corresponding to the key; and updating a tail portion of a sorted key index to include the key.

9. The system of claim 8, wherein the table segment is implemented in the append-only storage medium.

10. The system of claim 8, wherein validating the update and determining whether to allow the update based on a result of the validating is in response to the property indicating that the update in the group of updates is the conditional update.

11. The system of claim 8, wherein the tail portion of the sorted key index comprises a flag associated with the key, and wherein the flag indicates whether the key has been deleted.

12. The system of claim 8, wherein the operations further comprise, in response to a range request for keys in a range [K1 . . . K2], generating a list comprising keys between K1 and K2.

13. The system of claim 8, wherein validating the update further comprises querying a persisted portion of the table segment index to determine whether the persisted portion of the table segment index comprises the expected value.

14. A non-transitory machine-readable medium comprising executable instructions to organize data for storage via an append-only storage medium, wherein when executed by a hardware processor, the executable instructions facilitate performance of operations, the operations comprising:

processing a group of updates directed to a table segment, the processing comprising:
receiving the group of updates,
wherein an update in the group of updates comprises a key and a value, and
wherein the update in the group of updates comprises a property to indicate whether the update is a conditional update;
validating the update and determining whether to allow the update based on a result of the validating, wherein validating the update comprises querying a persisted portion of the table segment index to determine whether the persisted portion of the table segment index comprises the expected value;
serializing the group of updates;
appending the group of updates to the table segment;
updating a tail portion of a table segment index to include an offset corresponding to the key; and
updating a tail portion of a sorted key index to include the key.

15. The non-transitory machine-readable medium of claim 14, wherein validating the update further comprises querying the tail portion of the table segment index to determine whether the tail portion of the table segment index comprises an expected value.

16. The non-transitory machine-readable medium of claim 14, wherein the operations further comprise receiving a request for a list of keys in the table segment index.

17. The non-transitory machine-readable medium of claim 16, wherein the request for the list of keys in the table segment comprises a lower bound value and an upper bound value.

18. The non-transitory machine-readable medium of claim 16, wherein the operations further comprise querying the tail portion of the sorted key index for a first list of keys that satisfy the request.

19. The non-transitory machine-readable medium of claim 18, wherein the operations further comprise querying a persisted portion of the sorted key index for a second list of keys that satisfy the request.

20. The non-transitory machine-readable medium of claim 19, wherein the operations further comprise merging the first list of keys and the second list of keys into a merged list of keys and returning the merged list of keys in response to the request.

* * * * *